(12) United States Patent
Grubbs et al.

(10) Patent No.: US 10,556,222 B2
(45) Date of Patent: Feb. 11, 2020

(54) NANOFIBROUS MATERIALS FOR HEAVY METAL ADSORPTION

(71) Applicant: The Research Foundation for the State University of New York, Albany, NY (US)

(72) Inventors: Robert B. Grubbs, Miller Place, NY (US); Benjamin S. Hsiao, Setauket, NY (US); Benjamin Chu, Setauket, NY (US); Rui Yang, Fair Lawn, NJ (US)

(73) Assignee: The Research Foundation for the State University of New York, Albany, NY (US)

( * ) Notice: Subject to any disclaimer, the term of this patent is extended or adjusted under 35 U.S.C. 154(b) by 820 days.

(21) Appl. No.: 15/065,972

(22) Filed: Mar. 10, 2016

(65) Prior Publication Data
US 2016/0263554 A1  Sep. 15, 2016

Related U.S. Application Data

(60) Provisional application No. 62/130,823, filed on Mar. 10, 2015.

(51) Int. Cl.
*B01J 20/26* (2006.01)
*B01J 20/28* (2006.01)
(Continued)

(52) U.S. Cl.
CPC .......... *B01J 20/265* (2013.01); *B01D 67/002* (2013.01); *B01D 67/0093* (2013.01);
(Continued)

(58) Field of Classification Search
CPC ................ B01J 20/265; B01J 20/28038; B01J 20/28083; B01J 20/28085; B01J 20/3085;
(Continued)

(56) References Cited

U.S. PATENT DOCUMENTS 3,894,166 A   7/1975  Brown et al.
4,414,111 A  11/1983  Iwaisako et al.
(Continued)

FOREIGN PATENT DOCUMENTS

WO  2007001405 A2  1/2007
WO  2009064767 A2  5/2009
WO  2010042647 A2  4/2010

OTHER PUBLICATIONS

Rui Yang et al., "Thiol-modified cellulose nanofibrous composite membranes for chromium (VI) and lead (II) adsorption", Polymer, vol. 55, pp. 1167-1176 (2014).
(Continued)

*Primary Examiner* — Vishal V Vasisth
(74) *Attorney, Agent, or Firm* — Carter, DeLuca & Farrell LLP

(57) ABSTRACT

Water filtration membranes are provided. Such membranes include polysaccharide fibers that have been modified to possess thiol groups thereon, resulting in materials that effectively bind heavy metal ions. The resulting fibers may be used by themselves or applied to a scaffold to form a membrane suitable for removing heavy metals from water, including groundwater.

13 Claims, 13 Drawing Sheets

(51) Int. Cl.
 *B01J 20/30* (2006.01)
 *B01D 67/00* (2006.01)
 *B01D 71/08* (2006.01)
 *B01D 71/10* (2006.01)
 *C02F 1/44* (2006.01)
 *C02F 101/20* (2006.01)

(52) U.S. Cl.
 CPC ............ *B01D 71/08* (2013.01); *B01D 71/10* (2013.01); *B01J 20/28038* (2013.01); *B01J 20/28083* (2013.01); *B01J 20/28085* (2013.01); *B01J 20/3085* (2013.01); *C02F 1/444* (2013.01); *B01D 2323/36* (2013.01); *B01D 2323/39* (2013.01); *B01D 2325/12* (2013.01); *C02F 2101/20* (2013.01)

(58) Field of Classification Search
 CPC .... B01D 67/0093; B01D 71/08; B01D 71/10; B01D 2323/36; C02F 2101/20
 See application file for complete search history.

(56) References Cited

U.S. PATENT DOCUMENTS

| | | |
|---|---|---|
| 2005/0073075 A1 | 4/2005 | Chu et al. |
| 2006/0068668 A1 | 3/2006 | Kameoka et al. |
| 2007/0298064 A1 | 12/2007 | Koslow |
| 2008/0149561 A1 | 6/2008 | Chu et al. |
| 2009/0065436 A1 | 3/2009 | Kalayci et al. |
| 2010/0059447 A1 | 3/2010 | Martikainen |
| 2010/0323573 A1* | 12/2010 | Chu ................ B01D 65/08 442/153 |
| 2013/0180917 A1 | 7/2013 | Chu et al. |

OTHER PUBLICATIONS

Rui Yang et al., "Thiol-functionalized chitin nanofibers for As (III) adsorption", Polymer, vol. 60, pp. 9-17 (2015).

* cited by examiner

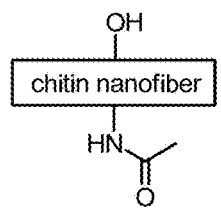 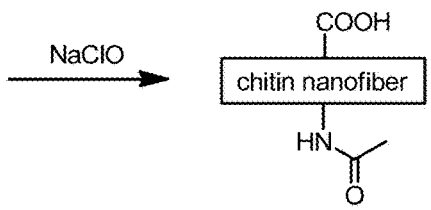 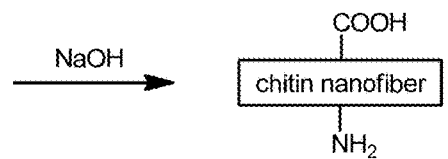
Figure 1A        Figure 1B        Figure 1C
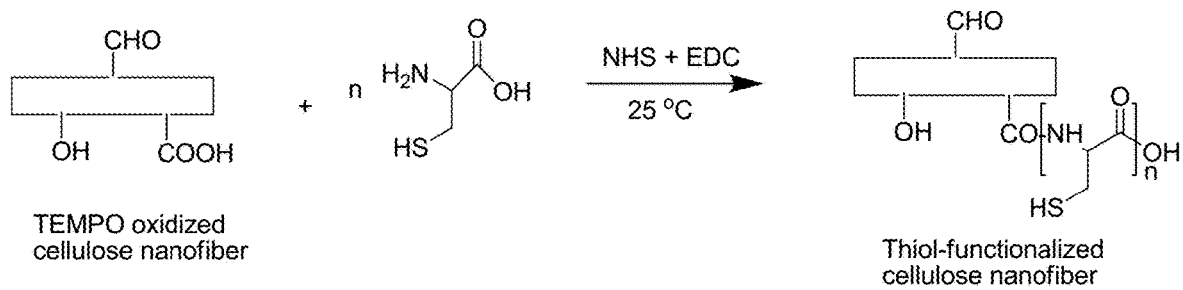
Figure 2
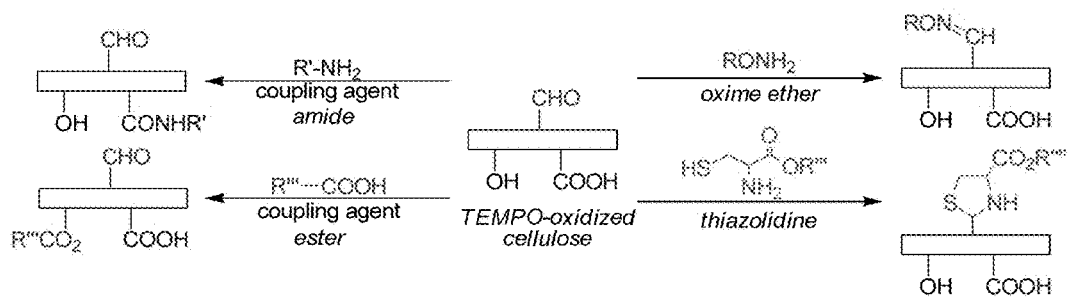
Figure 3

E-spun PAN nanofibrous matrix  m-CNF incorporated PAN matrix

NANOFIBROUS MATERIALS FOR HEAVY METAL ADSORPTION

CROSS REFERENCE TO RELATED APPLICATIONS

This application claims the benefit of, and priority to, U.S. Provisional Patent Application Ser. No. 62/130,823, filed Mar. 10, 2015, the entire disclosure of which is incorporated by reference herein.

GOVERNMENT RIGHTS

This invention was made with Government Support under grant numbers DMR-1019370 and DMR-1409507 awarded by the National Science Foundation. The government has certain rights in the invention.

BACKGROUND

Heavy metal ion pollution caused by agriculture and manufacturing (e.g., mining and automobile manufacturing) is a worldwide problem. Heavy metal ions include, for example, lead, arsenic, mercury, antimony and chromium (VI). The pollutants can contaminate rivers and lakes, and be a major threat to public safety, especially for drinking water.

For example, according to the World Health Organization (WHO), the health effects of long term exposure to 0.015 ppm of lead (II) include headache, irritability, abdominal pain and various symptoms related to the nervous system, and long-term exposure to chromium (VI) levels over 0.1 ppm can cause respiratory problems, kidney and liver damage. Short term and long term intake of arsenic-contaminated water can cause severe health problems, such as spontaneous pregnancy loss, respiratory complications, immunological system disorders and black foot disease.

Heavy metal removal by membrane filtration has been well demonstrated in the industry. Typically, membrane filtration approaches often involve nanofiltration or reverse osmosis, which invariably have high energy costs and can require high pressure.

Improved materials and methods for removing contaminants, including toxic heavy metal ions, from water remain desirable.

SUMMARY

The present disclosure provides membranes suitable for removing contaminants from water, as well as methods for making these membranes. In embodiments, the contaminants include heavy metal ions.

Membranes of the present disclosure include, in embodiments, ultra-fine polysaccharide nanofibers functionalized with at least one thiol group, the nanofibers having a diameter from about 3 nm to about 50 nm and a length from about 100 nm to about 5000 nm.

Suitable polysaccharides for forming the ultra-fine polysaccharide nanofibers include, for example, cellulose, chitin, collagen, gelatin, chitosan, microcrystalline cellulose, bacterial cellulose, starch, alginic acid, combinations thereof, and the like.

In embodiments, suitable nanofibers include polysaccharides such as cellulose prepared by a 2,2,6,6-tetramethylpiperidine-1-oxyl (TEMPO)/NaBr/NaClO oxidation system in aqueous solution. In other embodiments, suitable nanofibers include polysaccharides such as chitin treated with an oxidation agent, an optional acid, and an optional base. These methods for preparation/treatments result in an activated polysaccharide nanofiber possessing functional groups such as carboxylates, aldehydes, amines, and combinations thereof.

Once the activated polysaccharide nanofibers have been prepared, methods of the present disclosure include contacting the activated polysaccharide nanofiber with at least one reactant such as cysteine, cystamine, 3-amino-1-propanethiol, 6-amino-1-hexanethiol, 8-amino-1-octanethiol, 11-amino-1-undecanethiol, 16-amino-1-hexadecanethiol. 3-mercaptopropionic acid, 6-mercaptohexanoic acid, 8-mercaptooctanoic acid, 11-mercaptoundecanoic acid, 12-mercaptododecanoic acid, 16-mercaptohexadecanoic acid, and combinations thereof to form thiol-functional polysaccharide nanofibers, and recovering the thiol-functional polysaccharide nanofibers possessing thiol groups.

In embodiments, methods of the present disclosure further include contacting the ultra-fine polysaccharide nanofibers, the at least one reactant, or both, with a catalyst such as 1-ethyl-3-(3-dimethylaminopropyl)carbodiimide hydrochloride, N-hydroxysuccinimide, and combinations thereof.

Methods for using the membranes of the present disclosure are also provided. These methods include, in embodiments, passing a fluid through a membrane of the present disclosure and recovering the fluid that has passed through the membrane.

BRIEF DESCRIPTION OF THE DRAWINGS

Various embodiments of the present disclosure will be described herein with reference to the following figures, wherein:

FIG. 1 includes a schematic showing the chemical treatment of chitin in accordance with the present disclosure at different stages: FIG. 1 (A) chitin nanofiber suspension after the acid/base treatment, FIG. 1 (B) chitin nanofiber suspension after the NaClO treatment, and FIG. 1 (C) chitin nanofiber suspension (concentration 0.5 wt %) after the NaOH treatment;

FIG. 2 is a schematic showing the reaction of cysteine with TEMPO oxidized cellulose nanofibers in accordance with the present disclosure;

FIG. 3 is a schematic showing alternate modifications of TEMPO-oxidized cellulose in accordance with the present disclosure;

DETAILED DESCRIPTION

Figures 4A, 4B:
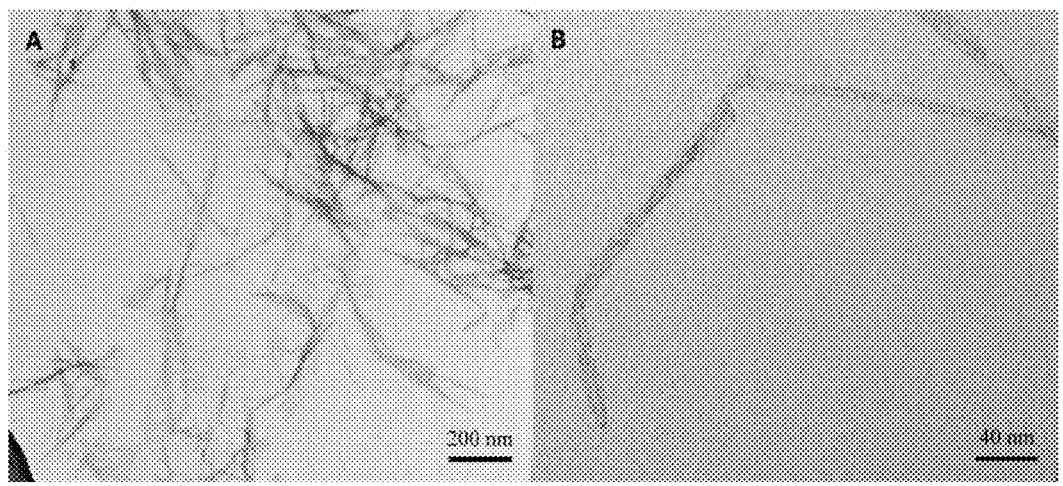
FIGS. 4A-4B are transmission electron microscope (TEM) images of A: TEMPO oxidized cellulose nanofibers (CNF); B: individual CNF (samples were prepared by dropping a 0.01 wt % CNF suspension on carbon-coated copper grids; all TEM samples were stained with 2.0 wt % uranyl acetate)

The present disclosure provides methods for generating nanofibrous based functionalized materials for heavy metal adsorption applications. These adsorbents include activated carbon, carbon nanotubes and bioadsorbents (e.g., shrimp and crab shells, dead bacteria, spent yeast). For example, chitin is the second-most abundant natural polysaccharide after cellulose, and is non-toxic, biodegradable and biocompatible. It can be obtained from shellfish exoskeletons (e.g. shrimp and crab shells) or from plants (e.g. mushrooms).

The resulting materials may be used to form membranes capable of removing metal ions from any liquid. In embodiments, the membranes may be utilized to remove these items from water supplies. In other embodiments, the filters may be used to remove these items from food products, for example wine and beer, from pharmaceutical or biopharmaceutical product streams, and the like.

More specifically, nanofibers of the present disclosure can include polysaccharide nanofibers, which have been modified to enhance their ability to remove heavy metal ions from fluids. Suitable polysaccharides for use in forming nanofibers of the present disclosure include cellulose, chitin, collagen, gelatin, chitosan, microcrystalline cellulose, bacterial cellulose, starch, alginic acid, combinations thereof, and the like.

In embodiments, suitable nanofibers include polysaccharides such as cellulose prepared by a 2,2,6,6-tetramethylpiperidine-1-oxyl (TEMPO)/NaBr/NaClO oxidation system in aqueous solution. Examples of this process include those disclosed in U.S. Patent Application Publication No. 2013/0180917, the entire disclosure of which is incorporated by reference herein. In embodiments, the $C_6$-hydroxyl group is oxidized to a certain degree with this oxidation system to form carboxylate groups and aldehyde groups. After oxidation, both carboxylate and aldehyde groups may be produced, in addition to the original hydroxyl groups. After mild mechanical treatment (e.g., stirring or mixing with a homogenizer at a speed of 5000 rpm), ultra-fine polysaccharide nanofibers having a large number of carboxylic acid groups are produced (0.05-1.8 mmol/gram cellulose) and aldehyde groups (0.05-0.35 mmol/grams), depending on the degree of oxidation. Higher NaClO concentrations will produce higher surface concentrations of carboxylate, because aldehydes can be oxidized to carboxylate groups. So, the amount of aldehydes decreases and the amount of carboxylates increases at the highest NaClO concentrations, as the aldehydes are completely oxidized into carboxylates.

In other embodiments, a different class of nanoscaled materials is used as the nanofibers. Chitin is the second-most abundant natural polysaccharide after cellulose and is non-toxic, biodegradable and biocompatible. Chitin fibers have hydroxyl- and amide-functional surfaces. In some cases, the amide groups may be hydrolyzed to amines. In accordance with the present disclosure, ultra-fine (diameters in tens of nanometers) and relatively uniform chitin nanofibers can be extracted from shrimp shells using a series of chemical and mechanical treatments and further modified to form nanofibers of the present disclosure.

Chitin nanofibers may be oxidized by treating with oxidation agents, optionally in combination with acids, bases, combinations thereof, and the like. Suitable oxidation agents include, for example, sodium hypochlorite, sodium chlorite, concentrated nitric acid/sodium nitrite, combinations thereof, and the like. Where utilized, suitable acids include, for example, hydrochloric acid, nitric acid, sulfuric acid, perchloric acid, trifluoroacetic acid, formic acid, combinations thereof, and the like. Where utilized, suitable bases include, for example, sodium hydroxide, lithium hydroxide, potassium hydroxide, combinations thereof, and the like. In some embodiments, the chitin nanofibers are treated only with oxidation agents. In other embodiments, chitin nanofibers are treated with acids, oxidation agents, and bases.

In embodiments, the amount of oxidation agents applied to the nanofibers may be from about 50% by weight to about 200% by weight of the nanofibers, in embodiments from about 80% by weight to about 100% by weight of the nanofibers. The oxidation agents may be contacted with the nanofibers for a period of time from about 0.5 hours to about 48 hours, in embodiments from about 5 hours to about 12 hours. The oxidation agents may be contacted with the nanofibers at temperatures from about 20° C. to about 100° C., in embodiments from about 50° C. to about 80° C.

Where utilized, the amount of acid applied to the nanofibers may be from about 30% by weight to about 200% by weight of the nanofibers, in embodiments from about 50% by weight to about 100% by weight of the nanofibers. The acid may be contacted with the nanofibers for a period of time from about 0.1 hours to about 24 hours, in embodiments from about 1 hour to about 12 hours. The acid may be contacted with the nanofibers at temperatures from about 20° C. to about 100° C., in embodiments from about 50° C. to about 80° C.

Where utilized, the amount of base applied to the nanofibers may be from about 50% by weight to about 500% by weight of the nanofibers, in embodiments from about 100% by weight to about 200% by weight of the nanofibers. The base may be contacted with the nanofibers for a period of time from about 0.1 hours to about 24 hours, in embodiments from about 1 hour to about 12 hours. The base may be contacted with the nanofibers at temperatures from about 20° C. to about 100° C., in embodiments from about 50° C. to about 80° C.

For example, in embodiments, chitin fibers may be treated with hydrochloric acid (HCl), followed by an oxidation agent such as sodium hypochlorite (NaClO), and then treated with a base such as sodium hydroxide (NaOH). The NaClO may introduce carboxylate groups on the chitin nanofibers, and the treatment with NaOH may form amine groups on the chitin nanofibers, as shown in FIG. 1.

In embodiments, the fiber diameters of ultra-fine nanofibers, in embodiments polysaccharide nanofibers, may be from about 3 nm to about 50 nm, in embodiments from about 4 nm to about 30 nm, in embodiments from about 10 nm to about 25 nm. The fiber length of ultra-fine nanofibers, in embodiments polysaccharide nanofibers, may be from about 100 nm to about 5000 nm, in embodiments from about 500 nm to about 2500 nm, in embodiments from about 750 nm to about 1500 nm.

The nanofibrous materials of the present disclosure, with very large surface-to-volume ratios due to small fiber cross-sections, can be modified to become effective metal ion adsorbents by chemical grafting of suitable functional molecules on the fiber surface.

In accordance with the present disclosure, the polysaccharide nanofibers, in embodiments cellulose or chitin, are modified to possess thiol groups. This further increases the capacity of the fibers for metal ion removal.

Thiol-functionalized cellulose nanofibers may then be created by grafting any compound possessing a primary amine group and a thiol group. In embodiments, suitable compounds to form thiol-functionalized nanofibers include cysteine, cystamine, 3-amino-1-propanethiol, 6-amino-1-hexanethiol, 8-amino-1-octanethiol, 11-amino-1-undecanethiol, 16-amino-1-hexadecanethiol, combinations thereof, and the like. These compounds may be grafted onto the surface of nanofibers through the formation of amide bonds between amine groups of the grafted reagent and carboxylate groups on the cellulose.

In embodiments, the reaction of cellulose nanofibers to form thiol-functionalized nanofibers may be carried out in the presence of carbodiimide coupling reagents, such as I-ethyl-3-(3-dimethylaminopropyl)carbodiimide hydrochloride (EDC). In embodiments, ester activating groups, such as N-hydroxysuccinimide (NHS), may also be used. Catalysts such as NHS and/or EDC activate the carboxylate groups for spontaneous reaction with primary amines to form peptide bonds, as shown in FIG. 2. Due to the excess amount of cysteine in the reaction, grafted cysteine oligomers could also result. Similarly, cysteine may be activated with EDC and NHS so that it can react with amine groups on the chitin. For reaction of chitin amine groups with acid reagents, the acid groups of the added reagents may be reacted with EDC and NHS to activate the reagents for the formation of peptide groups on the chitin nanofibers.

In other embodiments, it is possible to form amide linkages without coupling agents by heating the materials. Suitable methods for heating these materials include, for example, those disclose in Melone, et al., "TEMPO-Oxidized Cellulose Cross-Linked with Branched Polyethyleneimine: Nanostructured Adsorbent Sponges for Water Remediation," ChemPlusChem 2015, 80, 1408-1415, and Xu, et al., "Crosslinking Chitosan into H3PO4/HNO3-NANO2 Oxidized Cellulose Fabrics as Antibacterial-Finished Material," Carbohydrate Polymers 2014, 112, 186-194, the entire disclosures of each of which are incorporated by reference herein.

Thiol-functionalized chitin nanofibers may also be created by grafting thereto any compound with a carboxylic acid group and a thiol group. In embodiments, cysteine, 3-mercaptopropionic acid, 6-mercaptohexanoic acid, 8-mercaptooctanoic acid, 11-mercaptoundecanoic acid, 12-mercaptododecanoic acid, or 16-mercaptohexadecanoic acid may be grafted onto the surface of the nanofibers through the formation of amide bonds between acid groups of the grafted reagent and amine groups on the chitin.

In embodiments, the compound utilized to functionalize the nanofibers to produce thiol groups thereon may be in a solution. Suitable solvents include, for example, water, tetrahydrofuran, dichloromethane, N,N-dimethylformamide, N,N-dimethyl acetamide, N-methyl-2-pyrrolidine, combinations thereof and the like. The solution including the compound utilized to form thiol groups on the nanofibers may be in such a solution at a concentration from about 1% by weight to about 50% by weight, in embodiments from about 10% by weight to about 20% by weight.

Methods for applying the solution possessing the compound utilized to functionalize the nanofibers to produce thiol groups thereon are within the purview of those skilled in the art and include, for example, dipping, spraying, combinations thereof and the like. After application, the solvent may be driven off by methods within the purview of those skilled in the art, including heating, vacuum, combinations thereof, and the like.

The compound utilized to form thiol groups on the nanofibers may be added to the cellulose or chitin nanofibers in amounts from about 30 to about 200% by weight of cellulose nanofibers, in embodiments from about 50 to about 100% by weight of cellulose nanofibers. Reaction conditions for reacting the compound utilized to form thiol groups, in embodiments cysteine, with the nanofibers include temperatures from about 20° C. to about 100° C., in embodiments from about 50° C. to about 80° C., for a suitable period of time from about 0.5 hours to about 48 hours, in embodiments from about 5 hours to about 12 hours.

The resulting thiol-functional materials may then be used for removal of heavy metal ions from liquids, including groundwater. The thiol-functional fibers may be formed into a membrane suitable for use as a filter in treating liquids.

In other embodiments the thiol-functional materials may be applied to a nanofibrous scaffold to form an article suitable for adsorption of heavy metals. These scaffolds may be made of suitable polymers within the purview of one skilled in the art, including, but not limited to, polyolefins including polyethylene and polypropylene, polysulfones such as polyethersulfone, fluoropolymers such as poly(vinylidene fluoride), polyesters including poly(ethylene terephthalate), poly(trimethylene terephthalate), and poly(butylene terephthalate), polyamides including nylon 6, nylon 66, and nylon 12, polycarbonates, polystyrenes, polyacrylonitrile, polyacrylates such as poly(methyl methacrylate), polyacetates such as poly(vinyl acetate), polyalcohols such as poly(vinyl alcohol), polysaccharides (such as chitosan, cellulose, collagen, or gelatin), proteins such as chitin, hyaluronic acid, poly(alkylene oxides) such as poly(ethylene oxide) and poly(ethylene glycol), polyurethanes, polyureas, polyvinyl chloride, polyimines such as poly(ethylene imine), polyvinylpyrrolidone, polyacrylic acids, polymethacrylic acids, polysiloxanes such as polydimethylsiloxane, poly(ester-co-glycol) copolymers, poly(ether-co-amide) copolymers, crosslinked forms thereof, derivatives thereof and copolymers thereof. In some embodiments, poly(acrylonitrile) (PAN), polyethersulfone (PES), poly(vinylidene fluoride) (PVDF), and/or crosslinked water soluble polymers, e.g., poly(vinyl alcohol) (PVA), their chemical derivatives and copolymers may be utilized. Combinations of the foregoing may also be used to form suitable scaffolds.

In some embodiments, it may be desirable to crosslink fluid-soluble polymers. For example, water-soluble polymers, such as poly(vinyl alcohol), polysaccharides (including hyaluronan), polyalkylene oxides (including poly(ethylene oxide)), gelatin and their derivatives to render these polymers suitable for use as a nanofibrous scaffold. Crosslinking may be conducted using methods within the purview of those skilled in the art, including the use of crosslinking agents. Suitable crosslinking agents include, but are not limited to, $C_2$-$C_8$ dialdehyde, $C_2$-$C_8$ diepoxy, $C_2$-$C_8$ monoaldehydes having an acid functionality, and $C_2$-$C_9$ polycarboxylic acids. These compounds are capable of reacting with at least two hydroxyl groups of a water-soluble polymer. Other suitable crosslinking methods include conventional thermal-, radiation- and photo-crosslinking reactions within the purview of those skilled in the art. Two important criteria for the selection of a crosslinking agent or method are as follows: (1) the crosslinking agent or method should not dissolve the nanofibrous scaffold layer, and (2) the crosslinking agent or method should not induce large dimensional change, e.g., electrospun nanofibrous scaffold layers may display very large shrinkage in hydrophobic solvents such as hydrocarbons because of their hydrophilic nature.

Specific examples of crosslinking agents which may be utilized include, but are not limited to, glutaraldehyde, 1,4-butanediol diglycidyl ether, glyoxal, formaldehyde, glyoxylic acid, oxydisuccinic acid and citric acid. In some embodiments, it may be useful to treat poly(vinyl alcohol) with a crosslinking agent such as glutaraldehyde.

The amount of crosslinking agent added to the water-soluble polymer such as poly(vinyl alcohol) may vary, from about 0.1 to about 10 percent by weight of the combined crosslinking agent and polymer, in some embodiments from about 0.5 to about 5 percent by weight of the combined crosslinking agent and polymer.

In some embodiments, the fiber diameters of the nanofibrous scaffolds may be from about 50 nm to about 500 nm, in embodiments from about 100 nm to about 400 nm. The thickness of the nanofibrous scaffold may vary from about 1 μm to about 500 μm, in embodiments from about 10 μm to about 300 μm, in embodiments from about 30 μm to about 150 μm in thickness. In some embodiments, the thickness of the scaffold is from about 40 μm to about 50 μm.

The nanofibrous scaffold possesses pores or voids which assist in the functioning of the membranes of the present disclosure. The diameter of these voids may be from about 10 nm to about 200 μm, in embodiments from about 50 nm to about 30 μm, in embodiments from about 100 nm to about 10 μm. In some embodiments, the pore size may be from about 0.2 μm to about 0.6 μm.

In forming the nanofibrous scaffold of the present disclosure, the polymer is often first placed in a solvent, such as N,N-dimethyl formamide (DMF), tetrahydrofuran (THF), methylene chloride, dioxane, ethanol, propanol, butanol, chloroform, water, or mixtures of these solvents, so that the polymer is present at an amount from about 1 to about 40 wt %, in embodiments from about 3 to about 25 wt %, in embodiments from about 5 to about 15 wt % of polymer solution.

In some embodiments, it may be desirable to add a surfactant or another solvent-miscible liquid to the polymer solution utilized to form the nanofibrous scaffold to lower the surface tension of the solution, which may help stabilize the polymer solution during electro-spinning, electro-blowing, and the like. Suitable surfactants include, for example, octylphenoxypolyethoxy ethanol (commercially available as TRITON X-100), sorbitan monolaurate, sorbitan sesquioleate, glycerol monostearate, polyoxyethylene, polyoxyethylene cetyl ether, dimethyl alkyl amines and methyl dialkyl amines, and the like. Where utilized, the surfactant may be present in an amount from about 0.001 to about 10 percent by weight of the polymer solution, in embodiments from about 0.05 to about 5 percent by weight of the polymer solution, in embodiments from about 0.1 to about 2 percent by weight of the polymer solution. The solvent miscible fluid forms a solvent mixture with the solvent that can dissolve the polymer but changes the surface tension of the polymer solution and the evaporation rate of the solvent mixture.

In embodiments, the nanofibrous scaffold may be fabricated using electro-spinning, electro-blowing, blowing-assisted electro-spinning, and/or solution blowing technologies. Examples of these methods and their use in forming nanofibrous scaffolds are set forth in WO 2007/001405 and U.S. Patent Application Publication Nos. 2013/0180917 and 2005/0073075, the entire disclosures of each of which are incorporated by reference herein.

An asymmetric nanofibrous scaffold containing different fiber diameters and porosity can be used in some embodiments. In embodiments, the nanofibrous scaffold possesses two or more different layers. The fibers making up each layer of the nanofibrous scaffold may, in some embodiments, have a different diameter compared to the fibers making up other layers of the nanofibrous scaffold. For example, fibers making up one layer of the nanofibrous scaffold may have diameters from about 200 nm to about 10,000 nm, in embodiments from about 400 nm to about 2,000 nm, in embodiments from about 500 nm to about 1,000 nm, while fibers making up another layer of the nanofibrous scaffold may have diameters from about 5 nm to about 500 nm, in embodiments from about 15 nm to about 300 nm, in embodiments from about 30 nm to about 200 nm. The diameter of fibers may thus exhibit a gradient in size between layers. In such an embodiment, smaller diameter fibers of the bottom surface of the nanofibrous scaffold may be immediately adjacent to the substrate, and larger diameter fibers of the top surface of the nanofibrous scaffold may be on the opposite face of the scaffold, or vice-versa. Multiple layers, in embodiments more than the two layers described above, may be similarly combined to form a scaffold having multiple layers with different diameter fibers. Larger fiber diameters may be on top of smaller fiber diameters; smaller fiber diameters may be on top of large fiber diameters; and any combinations thereof.

In other embodiments, the nanofibrous scaffold may be subjected to a plasma treatment to enhance its adherence to a coating layer in forming an article of the present disclosure. Plasma treatment methods are within the purview of those skilled in the art, including, for example, atmospheric pressure plasma treatment on non-woven fabrics. This method has been demonstrated to be an effective means to improve the wettability as well as the affinity of the fiber surface for dyeing, chemical grafting and substrate adhesion. Plasma activation can produce functional groups and/or free radicals on the fiber surface, which can react with other molecules.

In embodiments, the scaffold layer of the membrane, such as polyacrylonitrile (PAN) or polyethersulfone (PES), may be electrospun on a substrate. Suitable substrates are within the purview of those skilled in the art and include nonwoven fibers of materials such as polyethylene terephthalate (PET), polypropylene, glass, cellulose, combinations thereof, and the like. In embodiments, the scaffold layer of the membrane may be electrospun onto a substrate, such as a non-woven polyethylene terephthalate (PET) micro-filter (AWA16-1 from SANKO LIMITED, 1316-1 Kawamuko cho, Tsuzuki-ku, Yokohama, 224-0044 Japan), utilizing methods within the purview of those skilled in the art.

In embodiments, the filter of the present disclosure is modified by infusing or depositing ultra-fine nanofibers, in embodiments thiol-modified polysaccharide nanofibers described above, into or onto the scaffold. In embodiments, the fine fibers are nanofibers. The nanofibers can be used to adsorb toxic metal ions from water or other liquids and/or solutions. In embodiments, this infusion or depositing of the thiol-modified polysaccharide nanofibers described above, into or onto the scaffold, may occur by applying a solution possessing the thiol-modified polysaccharide to the scaffold. Suitable solvents for forming such a solution include, but are not limited to, water, N,N-dimethylformamide, N,N-dimethylacetamide, N-methyl-2-pyrrolidine, combinations thereof, and the like. The thiol-modified polysaccharide may be in the solution at a concentration from about 0.1% by weight to about 50% by weight, in embodiments from about 1% by weight to about 10% by weight.

Methods for applying the thiol-modified polysaccharide nanofibers to the scaffold include dipping, spraying, knife-coating, combinations thereof, and the like.

In embodiments, ultrafine polysaccharide nanofibers (~5 nm in diameter and a few hundred nanometers in length) may be used as the base material for adsorbent materials of the present disclosure. These nanofibers offer a very large surface to volume ratio, thus providing a great number of active sites for metal ion adsorption after the thiol-modification. While the nanofibers may be used by themselves, in embodiments polysaccharide nanofibers could be anchored by thermal cross-linking in an electrospun polyacrylonitrile (PAN) nanofibrous scaffold (fiber diameters or cross-sections of about hundreds of nm), resulting in the formation of nanofibrous composite membranes containing fibers of two different diameters. The resulting membranes containing functionalized cellulose nanofibers and/or functionalized chitin nanofibers showed large adsorption capacities, fast adsorption efficiency and high regenerability.

In embodiments, other groups on the polysaccharide nanofibers may be modified. For example, methods of the present disclosure provide for selective modification of each different functional group with orthogonal coupling chemistries. Examples of the various routes of modification are set forth in FIG. 3. Robust linkages can be made through formation of amide bonds: for cellulose, between surface carboxylate groups and functional amines; for chitosan, by reaction of surface amine groups with carboxylic acid derivatives. Ester linkages can be made by esterification of chitosan or cellulose hydroxyl groups with carboxylic acid derivatives. Relatively stable oxime linkages can be prepared by reaction of aldehyde groups with functional alkoxyamines. Alternatively, imine linkages can be made and reduced under benign conditions. Aldehydes can also readily be converted to functional thiazolidine groups through reaction with cysteine derivatives.

In accordance with the present disclosure, cellulose and chitin nanofibers with large surface-to-volume ratio and chemical functionality are utilized as a scaffold to remove toxic metal ions from liquids including water, such as ground water. Chemicals, such as $Fe(OH)_3$, may be coated onto the large surface-to-volume ratio nanofibers for water purification applications. Chemical modification schemes may be adopted to enhance the surface functionality of cellulose and/or chitin nanofibers, thereby improving the adsorption capability and capacity of nanofibrous membranes. Composite membranes may also be produced that exhibited both high-flux and high metal ions adsorption performance.

Heavy metal ions that may be removed include, for example, chromium, lead, arsenic, cupric, combinations thereof, and the like.

The following Examples are provided to illustrate, but not to limit, the features of the present disclosure so that those skilled in the art may be better able to practice the features of the disclosure described herein.

Example 1

Polyacrylonitrile (PAN, $M_w$=150,000 g/mol) was purchased from Scientific Polymer Products. L-cysteine (>97% purity), N,N-dimethylformamide (DMF), N-hydroxysuccinimide (NETS), N-(3-dimethyl-aminopropyl)-N'-ethylcarbodiimide hydrochloride (EDC), 2,2,6,6-tetramethyl-1-piperidinyloxy (TEMPO), sodium hypochlorite (NaClO), sodium chlorite ($NaClO_2$), sodium bromide (NaBr), potassium chromate ($K_2CrO_4$), lead nitrate ($Pb(NO_3)_2$), 1,5-diphenylcarbazide and 4-(2-pyridylazo)resorcinol (PAR), and phosphate buffer were purchased from Sigma-Aldrich. Ellman's Reagent (also known as DTNB (5,5'-dithio-bis-[2-nitrobenzoic acid])) was purchased from Thermo Scientific. Cellulose Biofloc-92 (wood bleached pulp) was provided from Tartas (France). Non-woven poly(ethylene terephthalate) (PET) microfilter substrate (average fiber diameter~10 μm) for membrane support was provided by Sanko (Japan No. 16-1).

Oxidized cellulose nanofibers (CNF) were produced by the TEMPO method based upon a procedure disclosed by Saito, T., et al., Cellulose nanofibers prepared by TEMPOmediated oxidation of native cellulose, Biomacromolecules, 2007. 8(8): p. 2485-2491. In brief, about 10 grams of dry wood pulp cellulose was dispersed in water (about 100 grams). Sodium bromide (about 2 grams, 19.4 mmol) and TEMPO (about 0.2 grams, 0.13 mmol) were dissolved in the same mixture. Sodium hypochlorite solution (about 75.0 grams, 10-13% aqueous solution) was then added to the stirred solution at room temperature. The stirring process was continued for about 24 hours, while the pH value was kept at about 10.5-11 (monitored with a pH meter) by adjusting the suspension with 0.5 mol/L sodium hydroxide aqueous solution (approximately 10 ml was used).

The resulting cellulose product was separated by centrifugation (at about 5500 revolutions per minute (rpm)), washed with deionized (DI) water and separated again by centrifugation several times, until the conductivity of the supernatant solution as tested by a conductivity meter did not change. The oxidized cellulose slurry (about 1.1 grams, >90 wt % cellulose) was then dispersed in about 100 grams of water and sonicated for about 15 minutes with a homogenizer (Cole Parmer, VCX-400). The resulting cellulose nanofiber aqueous suspension had a concentration of ~1 weight percent (wt %), as determined by a Total Organic Carbon analyzer (TOC-500, Shimadzu Corporation).

The resulting sample was examined by transmission electron microscopy (TEM). FIG. 4 shows typical TEM images of TEMPO-oxidized cellulose nanofibers. A typical size of the nanofiber is 5 to 10 nanometers in diameter and a few hundreds nanometers in length. The oxidation reaction broke up the cellulose wood pulp into smaller fibers and only the surface primary hydroxyl groups of the fiber were oxidized to aldehydes and carboxylates. The negatively charged carboxylate groups interfere with strong fiber-fiber hydrogen bonding and allow suspension of individual fibers in water.

About 100 grams of the resulting ~1 wt % CNF suspension was mixed with N-hydroxysuccinimide (NHS) (about 0.18 grams, 1.5 mmol), 1-ethyl-3-[3-dimethylaminopropyl] carbodiimide hydrochloride (EDC) (about 0.27 grams, 1.4 mmol) and cysteine (about 0.5 grams, 4.1 mmol). The resulting mixture was stirred at room temperature for about 24 hours. After reaction, the mixture was centrifuged at about 5000 rpm to separate the supernatant from the nanofibers. The supernatant was poured off and the nanofibers were re-suspended in water, and the washing and centrifugation process was repeated several times until the conductivity in the centrifugal tube did not change, which implied that only cellulose nanofibers (CNF) (yield of about 70%) remained in the suspension.

Example 2

The amount of carboxylate groups on the modified CNF (m-CNF) produced in Example 1 were quantified using an electric conductivity method. For this test, about 3 ml of 0.9 wt % CNF suspension from Example 1 was first diluted into about 50 ml DI water. About 3 ml of 0.1 M HCl was subsequently added to this suspension to keep the pH value between about 2 and about 3. Then, 50 µl aliquots of 0.05 M NaOH were continuously added at the rate of one aliquot every 20 seconds into the suspension to achieve a pH value of about 11, while the conductivity of the suspension was measured. The carboxylate content was determined from the conductivity and the pH curves.

To determine the amount of aldehyde groups, the same amount of cellulose slurry solution was mixed with $NaClO_2$ (about 0.5 grams) for overnight oxidation and then the mixture was washed with DI water and separated by centrifugation. The same conductivity titration method was used to determine the concentration of aldehyde groups. The aldehyde group concentration was equal to the carboxylate concentration from this titration minus the carboxylate concentration from the titration carried out prior to $NaClO_2$ oxidation.

Example 3

After the reaction of CNF with cysteine as described in Example 1, the modified cellulose nanofiber (m-CNF) suspensions were purified by dialysis against DI water until no carbon was detectable by TOC analysis of the solution outside the dialysis bag (molecular weight cut off (MWCO)=10,000 Daltons). Ellman's Reagent (also known as DTNB (5,5'-dithio-bis-[2-nitrobenzoic acid])) was used to determine the amount of thiol groups attached to cellulose nanofibers in the suspension. In this test, DTNB was used to react with thiols to cleave 2-nitro-5-thiobenzoate ($NTB^-$), which could ionize to the yellow color $NTB^2$ di-anion in aqueous solution at a pH of about 8. Thiol groups were assayed by using the molar adsorption coefficient of $NTB^-$ (about 14,150 L $mol^{-1}cm^{-1}$ at about 412 nm).

More specifically, DTNB (about 50 mg) was dissolved in phosphate buffer (about 10 ml, pH about 8). A cysteine-modified cellulose suspension (about 3 mL, 0.1 wt % cellulose) was mixed with the phosphate buffer (about 2 mL) and diluted with DI water (about 5 ml). The DTNB/buffer solution (about 0.02 mL) was then mixed with the modified cellulose/buffer suspension (about 3 mL) in a 1 cm cuvette and the absorbance at about 412 nm was measured after about 5 minutes of mixing. A sample of TEMPO oxidized cellulose (about 0.1 wt % in DI water) was used as the control sample for the same experiment.

A series of L-cysteine solutions with concentrations of about 0.1 mol/L, about 0.05 mol/L, about 0.01 mol/L, about 0.005 mol/L and about 0.0001 mol/L in phosphate buffer with Ellman's reagent were used to create a calibration curve. The following equation 1 was used to calculate the concentration of thiol groups in the suspension.

$$C_0 = \frac{A}{\varepsilon \cdot b} D \tag{1}$$

where $C_0$ is the original —SH concentration; A is the absorbance at 412 nm; b is the path length of spectrophotometric cuvette in centimeters (b=1 cm); c is the extinction coefficient (14150 L $mol^{-1}$ $cm^{-1}$), which is a measure of the amount of light absorbed per unit concentration, based on phosphate buffer at pH=8.0 and; D is the dilution factor (1.007), which is the total volume of the cellulose suspension with DTNB/buffer solution (3.02 ml) divided by the volume the of cellulose suspension (3.0 ml). In addition, the functional groups after cellulose modification were characterized using Fourier transform infrared spectroscopy (FT-IR) with attenuated total reflectance (ATR) accessory (Nicolet iS10 spectrophotometer, Thermo Scientific, Inc.). Each sample was freeze-dried and tested in the wave number range from about 4000 $cm^{-1}$ to about 650 $cm^{-1}$.

Figure 5:
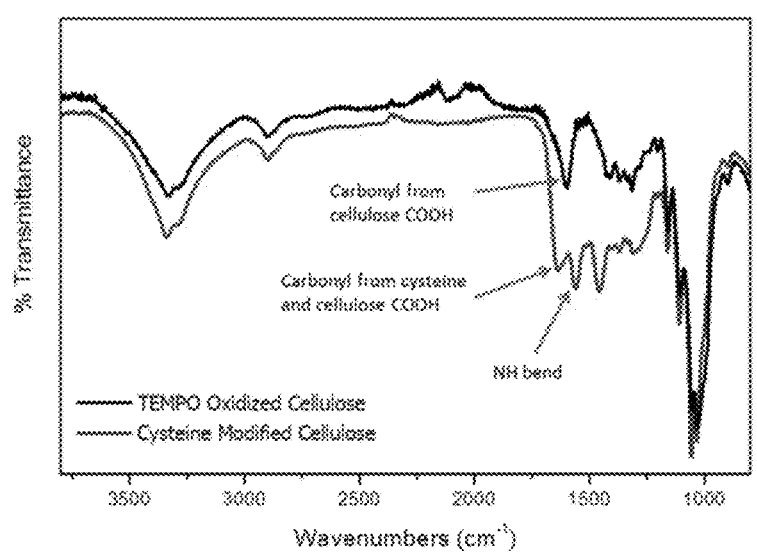
FIG. 5 includes Fourier transform infrared (FT-IR) spectra of TEMPO oxidized cellulose nanofibers (1.6 mmol/g COOH) and thiol-modified cellulose nanofibers.

After purification by dialysis, both freeze-dried modified/unmodified CNF were analyzed by FT-IR spectroscopy to show the presence of these functional groups. (FIG. 5). One carbonyl peak is at 1600 $cm^{-1}$ in the TEMPO-oxidized cellulose. In the cysteine-modified cellulose (m-CNF), the peak around 1640 cm$^{-1}$ is overlapping carbonyl absorptions from cellulose COOH and cysteine COOH. While the peak at 1560 cm$^{-1}$ is the NH bend. In addition, the CONH carbonyl group is between the two peaks but not clearly resolvable. These findings suggested successful grafting of cysteine onto the cellulose. One possibility for the IR absorbance around 1450 cm$^{-1}$ is thiazolidine ring from the formation of 2-alkylthiazolidine-4-carboxylic acid groups through reaction of aldehyde groups and cysteine.

Figure 6A:
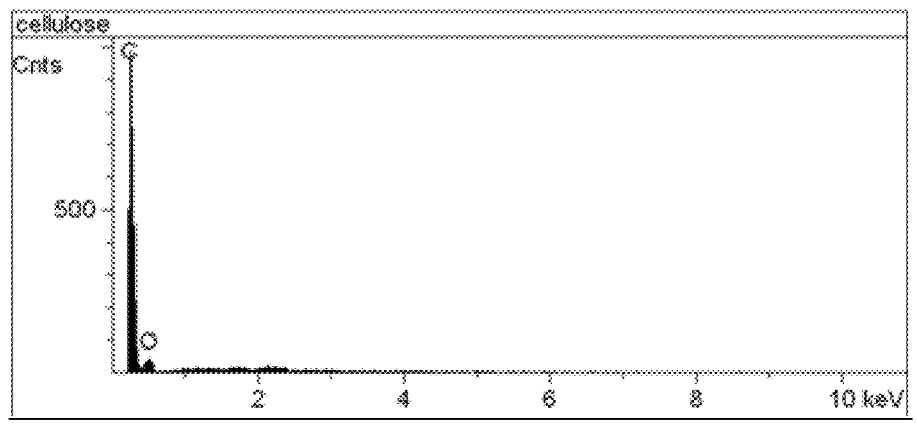
FIGS. 6A and 6B are Energy Dispersive Spectra (EDS) of TEMPO oxidized cellulose nanofibers (1.6 mmol/g —COOH) and thiol-modified cellulose nanofibers (0.9 mmol/g —SH)
Figure 6B:
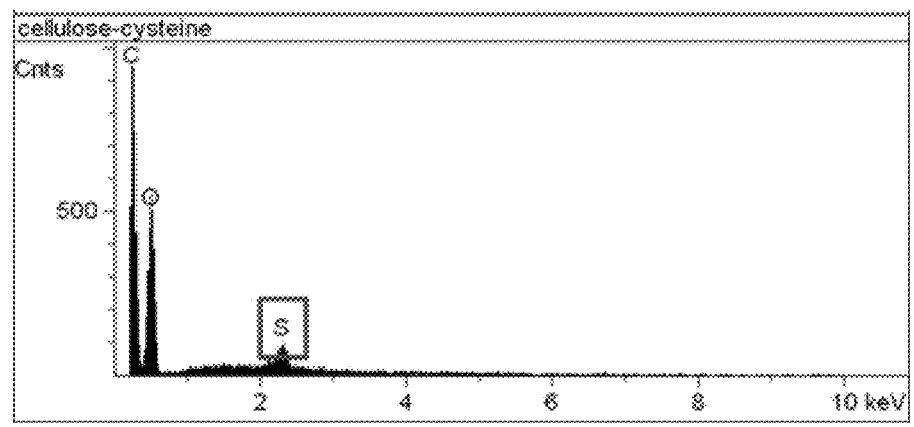

EDS analysis of cysteine-modified CNF (m-CNF) samples showed the presence of sulfur, further supporting the connection of cysteine to the nanofibers (FIG. 6B) when compared with the unmodified cellulose nanofiber (FIG. 6A). Both FIGS. 5 and 6A-6B demonstrate the creation of thiol-modified cellulose.

Modification reactions carried out at different molar ratios of CNF—COOH ([COOH]=1.6 mmol/grams; [CHO]=0.2 mmol/grams) to cysteine, at 1:2, 1:4, 1:6 and 1:8, are listed in Table 1. After purification by dialysis, the concentration of thiol groups were determined by mixing m-CNF suspension with Ellman's reagent. The concentration of the yellow-colored complex formed could be quantified by measuring absorption at about 412 nm. Then, the amount of thiol groups grafted on the CNF could be obtained in terms of m-CNF suspension concentration. The highest concentrations of thiol groups (0.9 mmol per gram CNF) were reached at a [cysteine]/[COOH] ratio greater than 6.

TABLE 1

Molar carboxylate/cysteine reaction ratios and thiol product amount

| Molar Reaction Ratio (—COOH/cysteine)* | m-CNF thiol concentration |
|---|---|
| 1:2 | 0.4 ± 0.05 mmol/g |
| 1:4 | 0.5 ± 0.07 mmol/g |
| 1:6 | 0.9 ± 0.1 mmol/g |
| 1:8 | 0.9 ± 0.1 mmol/g |

*all cysteine reactions used 1.6 mmol/g (—COOH) TEMPO oxidized cellulose.

Example 4

About 3.5 grams PAN was stirred in about 46.5 grams DMF at about 60° C. for about 2 days in a capped glass container to afford a homogeneous solution with a PAN concentration of about 7 wt %. The PAN solution was electrospun onto an aluminum foil or nonwoven PET support at about 15 kV by using an electrospinning instrument. The chosen flow rate was about 20 µl/minutes and the spinneret diameter was 0.7 mm. The working distance between the collector and the spinneret was about 10 cm.

In the electrospinning setup, a rotating metal drum (diameter: about 9 cm, rotating speed: about 300 rpm), covered with aluminum foil or nonwoven PET support was used to collect the deposited nanofibers. A stepping motor was used to control the oscillatory translational motion perpendicular to the drum rotation direction (the oscillation distance was about 12 cm) to ensure the production of more uniform electrospun scaffolds with a sufficiently large membrane size.

In order to make a cellulose nanofibrous composite membrane, a modified cellulose nanofiber suspension from Example 1 (about 2 mL, about 0.03 wt % CNF) was infused at a constant flow rate of about 2 ml/minute into a 2 inch diameter electrospun PAN scaffold supported by the PET non-woven substrate. The membrane was then dried at about 75° C. for about 2 minutes to induce thermal cross-linking of CNF to the electrospun PAN scaffold. The nanofibrous composite membrane was subsequently washed with about 15 ml DI water until TOC analysis showed no organic content.

Example 5

The electrospun PAN scaffold from Example 4 above was analyzed by using a scanning electron microscope (SEM, SFEG-SEM LEO1550) with Robinson backscattered electron detector and 10 eV Schottky field emission gun. The instrument was also equipped with an energy-dispersive spectroscopy (EDS) spectrometer (detector from EDAX and software/electronics from iXRF) to characterize chemical composition of membrane surfaces. Samples were first cut into 4 mm×8 mm pieces, peeled off from the PET support, and coated with platinum for about 15 seconds to enhance the surface conductivity. Cross-sectioned specimens were cut from the membranes in about 5 mm×15 mm pieces, treated with liquid nitrogen and cracked before platinum coating. In each SEM image, 40-50 fibers were selected for the analysis, where the Leica Microscopy Imaging software was used to estimate the average fiber diameter. The electrospun PAN membrane thickness was determined by using a micrometer (Chicago Brand-50073). The porosity of the membrane was calculated using equation 2 below, in which $\rho_0$ was the density of PAN (about 1.184 g/mL at about 25° C.), $\rho$ was the average density of the membrane calculated on the basis of 10 samples of mass over volume.

$$\text{Porosity} = (1 - \rho/\rho_0) \times 100\% \quad (2)$$

The electrospun PAN layers used to anchor modified cellulose nanofibers in membranes were characterized by SEM (FIG. 7). FIG. 7 shows SEM micrographs of 7 wt % electrospun PAN nanofibrous scaffold. PAN fibers electrospun from the 7 wt % PAN solution in DMF showed a diameter of 180±20 nm (FIG. 7A: top view, 7C: cross-section view). The pores of the electrospun film were interconnected with an average effective pore size of approximately 600 nm.

Figure 7A:
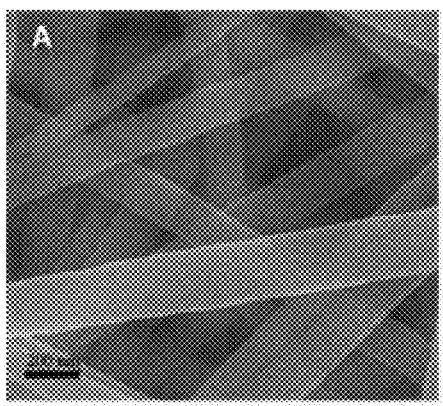
FIGS. 7A-7D are scanning electron microscope (SEM) images of an electrospun PAN nanofiber scaffold (from 7 wt % PAN solution) with scale bars of 200 nm: (A) top view, (C) cross-sectional view; and an electrospun PAN nanofiber scaffold (with 7 wt % PAN solution) infused with m-CNF solution (0.03 wt %): (B) top view, (D) cross-sectional view.
Figure 7B:
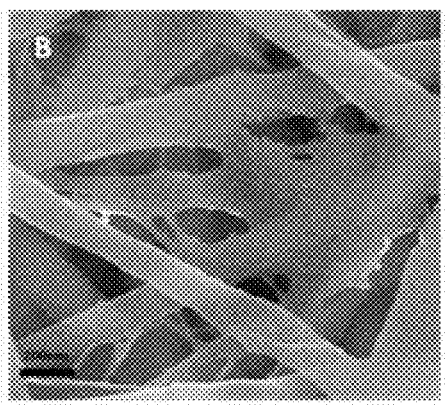
Figure 7C:
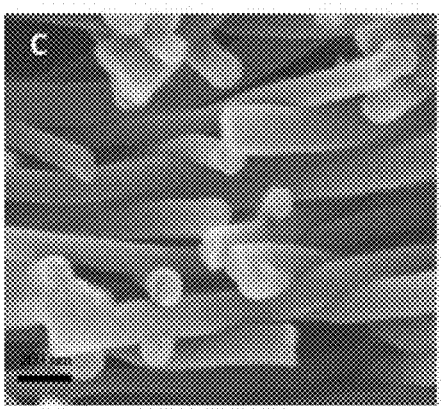
Figure 7D:
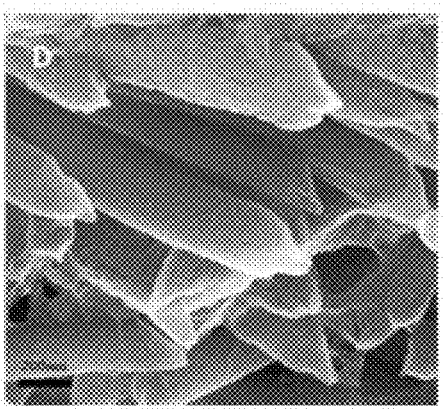

Composite membranes were prepared by infusing an aqueous suspension of m-CNF (0.03 wt %, 5-10 nm diameter, a few hundred nanometers length) through a PAN nanofibrous scaffold. FIG. 7 (7B=top view, 7D=cross-section view) shows m-CNF coated PAN fibers after infusion at a rate of about 2 ml/minute and subsequent heating at about 75° C. for about 2 minutes. As seen in FIGS. 7B and 7D, the modified cellulose nanofibers (m-CNF) appear to surround the PAN scaffold with m-CNF being associated to the PAN. The thermal treatment at 75° C. was important, creating strong links among the CNF by physical and chemical reactions. Since there was no organic carbon detectable by the TOC test in the filtrate after the membrane was subjected to water flow at 30 psi, the results suggested that the infused m-CNF were securely immobilized in the electrospun PAN scaffold. When comparing FIG. 7C with FIG. 7D, the increases in apparent surface roughness after m-CNF infusion clearly indicate association of m-CNF with the electrospun PAN nanofibers. It was found that the porosity of the membrane, which was 83% in the original PAN scaffold, was reduced to 78% in the m-CNF infused PAN scaffold. After the attachment of m-CNF to the PAN nanofibrous scaffold, the pure water flux dropped from 3000 L/m$^2$/h/psi to 1000 L/m$^2$/h/psi and the mean flow pore size dropped from 0.60 µm to 0.43 µm (See, Table 1).

The mean flow pore size and the maximum pore size were determined by using a Capillary Flow Porometer (Porous Materials Inc., CFP-1500A, USA). Before the test, a wetting reagent (surface tension 15.9 dynes/cm Galwich, PMI) was used to spontaneously fill the pores of the membrane. During the test, the wetting reagent was gradually removed until the pores became open at differential applied pressures. Flow rates of dry and wet membranes were automatically compared and calculated at different pressures by using the software Capwin (version 6.71.51, PMI), based on the Young-Laplace equation set forth below in equation 3:

$$D = \frac{4\gamma}{\Delta p}\cos\theta \qquad (3)$$

where D is the maximum diameter of the pore, $\gamma$ is the surface tension of the wetting reagent, $\Delta\rho$ is the differential pressure and $\theta$ is the wetting angle. The mean flow pore size was calculated at 50% flow passing through the membrane pores.

The pure water flux was measured by a dead-end filtration cell (Microsyringe Filter Holder-3002500, Millipore) as a function of time and pressure. A one-inch diameter round membrane was cut to fit the membrane holder. Permeability tests were conducted at about 2 psi and room temperature by determining the volume of DI water passing through the membrane per unit area, time and pressure. Comparison tests were carried out using both PAN/PET and m-CNF PAN/PET composite membranes.

Samples (30 mm×50 mm) of the electrospun PAN scaffold layer, with and without the infused m-CNF, were pre-cut into a dumbbell-like shape (the cutter was 50 mm×4 mm) and clamped onto a modified Instron 4410 tensile stretching device to determine the tensile strength. Uniaxial stretching was carried out at room temperature, where the chosen deformation rate was 10 mm/minute. The stress was defined as the load divided by the original cross section area; the strain was defined as the difference of the deformed length and the original length divided by the original length $((l-l_0)/l_0)$.

Example 6

Both static and dynamic adsorption experiments were carried out to evaluate the metal adsorption efficiency of the nanofibrous composite membranes of Example 5. Stock solutions of potassium chromate (about 100 ppm $K_2CrO_4$ in water) and lead nitrate (about 100 ppm $Pb(NO_3)_2$ in water) were used for this purpose.

For static adsorption experiments, metal ion solutions with concentrations ranging from about 10 to about 100 ppm were prepared by diluting the stock solution. Cysteine-modified composite membranes (diameter=about 2 inches, thickness=about 200 μm) adsorbent samples were added to a 50 ml centrifuge tube containing about 10 ml of metal ion solution and stirred at room temperature overnight. A series of adsorbents was tested, including m-CNF nanofibrous composite membrane, CNF nanofibrous composite membrane, pure electrospun PAN membrane, and 450 nm Millipore (SLFH 025NS) commercial microfiltration membrane. The membrane adsorption performance was measured at different initial metal ion concentrations and at solution pH values from about 2 to about 12 for Cr (VI) and about 2 to about 6 for Pb (II), adjusted by adding solutions of NaOH or HCl.

For dynamic adsorption studies, each adsorbent membrane was placed into a 2-inch diameter cell. Metal ion solutions (about 50 ppm in water) at the optimum pH determined in the static adsorption studies (pH about 4.0 for Cr(VI) and pH about 5.0 for Pb(II)) were injected through the membrane at the rate of about 2.0 ml/minute. The adsorption for both static and dynamic measurements was calculated according to equation 4 below:

$$Q = \frac{(C_i - C_f)V}{M} \qquad (4)$$

where Q is the amount of metal adsorbed (mg/g), $C_i$ is the initial metal ion concentration while $C_f$ is the final metal ion concentration (mg/L), V is the volume of solution (L) and M is the weight of adsorbent.

Membranes were removed from the solution and the residual metal ion concentration was determined by ultraviolet-visible (UV) spectrophotometry after treatment with chromogenic reagents. The calibration curve of Cr(VI) was made by the UV adsorption of about 0.5 ml Cr(VI) stock solution at about 20 ppm, about 40 ppm, about 60 ppm, about 80 ppm and about 100 ppm, separately mixed with about 0.5 ml 0.25 wt % 1,5-diphenylcarbazide (DPC) and made up to a total volume of about 10 ml with 0.5 N $H_2SO_4$ in a volumetric flask.

The adsorption of the Cr-DPC complex was measured at about 541 nm. The adsorption peak intensities are proportional to the concentration of the solution. The linear calibration curve of Pb(II) was made by the UV adsorption of about 0.5 ml Pb(II) stock solution at about 20 ppm, about 40 ppm, about 60 ppm, about 80 ppm and about 100 ppm, separately mixed with about 0.5 ml 0.024 wt % 4-(2-pyridylazo)resorcinol (PAR) and made up to a total volume of about 10 ml with borax buffer (pH=9). The adsorption of the Pb-PAR complex was measured at about 523 nm. To measure the residual metal ion concentration, about 0.5 ml of the solution remaining after membrane exposure was mixed with about 0.5 mL of the appropriate chromogenic reagent solution (DPC for Cr(VI) or PAR for Pb(II)) and the total solution volume was made up to about 10 mL with the appropriate solution (0.5 N $H_2SO_4$ for Cr(VI), borax buffer for Pb(II)), before measuring absorption at about 541 nm (for Cr(VI)) or about 523 nm (for Pb(II)).

Example 7

Figure 8:
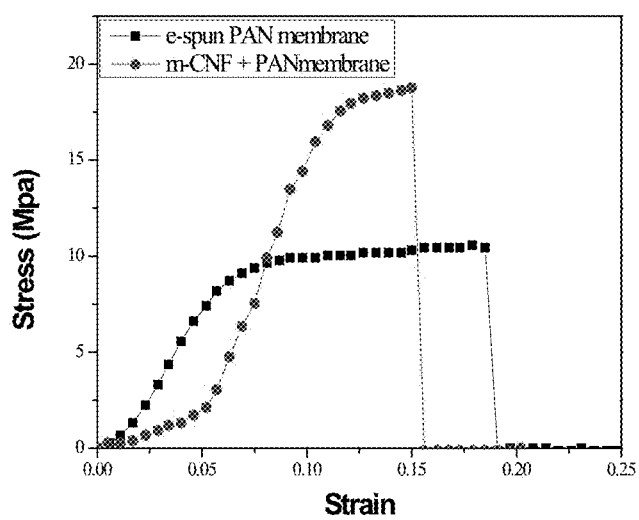
FIG. 8 is graph depicting the mechanical properties of PAN and m-CNF infused PAN nanofibrous composite membranes of the present disclosure (as well as a PAN/PET membrane)

Another way to characterize the stability of the m-CNF infused PAN scaffold was to test the mechanical property of the nanofibrous composite membranes. The mechanical properties of the samples were evaluated by using an Instron 4442 tensile apparatus at room temperature. The samples were cut into a dog-bone shape with a Dumbbell cutter (Dumbbell Co., Ltd.). The initial sample length between the Instron clamps was 30 mm and the chosen stretching rate was 5 mm/minute. The results of tensile strength testing of PAN and m-CNF infused PAN composite membranes (including the non-woven PET support) are shown in FIG. 8. It was found that that the m-CNF nanofibrous composite membrane demonstrated an almost doubling of Young's modulus when compared with that of the nanofibrous composite membrane without m-CNF. However, the elongation-to-break ratio of strain was reduced by 20% when compared with that of the unmodified one. Therefore, it is clear that the inclusion of m-CNF fibers in the PAN scaffold led to a stiffening of the membrane. This would also be regarded as evidence that the strong linkage CNF formation in e-spun matrix.

Example 8

The pH level of the solution had a profound impact on metal ion adsorption efficiency because it changed both the form of functional groups on the modified cellulose and also the form of metal ions. For example, chromate ions are in different forms at different pH conditions. Below 100 ppm of chromium ions in aqueous solutions, when the pH value is between 1 and 4, the major species is changing from $H_2CrO_4$ to $HCrO_4^-$. When the pH value increases from 4 to 14, the major species changes from $HCrO_4^-$ to $CrO_4^{2-}$. The initial $H_2CrO_4$ solution had a pH value of 4, indicating the pH value of a typical chromate contaminated solution. The Example also studied adsorption of lead at acidic condition, which reached the optimum adsorption at pH=5.0.

Figure 9A:
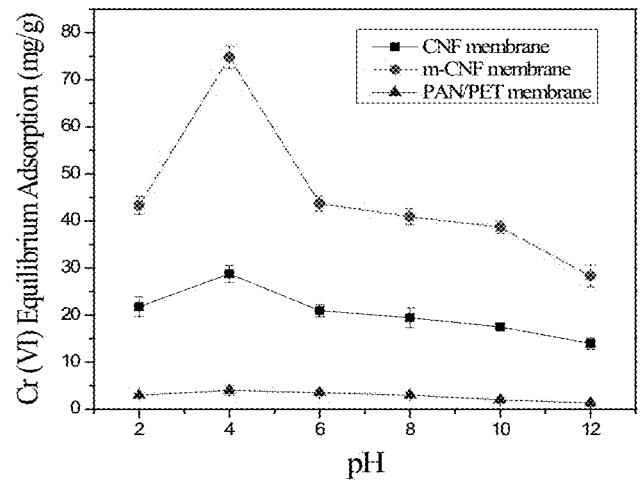
FIGS. 9A-9B are graphs depicting the effect of pH on static adsorption of Cr (VI) (FIG. 9A) and Pb (II) (FIG. 9B) for membranes of the present disclosure (m-CNF membranes), compared with unmodified membranes (CNF membranes), substrates without the membranes of the present disclosure (PAN/PET membranes), and commercially available filters (Millipore membranes)

Adsorption of chromate ($Cr_2O_7^{2-}$) was investigated at pH values ranging from 2 to 12, and the results are shown in FIG. 9A. The adsorption amount measurement was based on equation (4), using the chromate concentration differences before and after adsorption, multiplying the volume of the solution and divided by the mass of adsorbent. The concentrations are proportional to the intensity of the peak measured by UV at 541 nm.

It was found that the highest adsorption amount was 76.5±2.0 mg $Cr_2O_7^{2-}$ metal ions per gram of cellulose nanofiber at pH=4.0. The adsorption capacity of the m-CNF nanofibrous composite membrane with the CNF membrane without thiol modification was also compared. The results show that the m-CNF membrane exhibited 2 to 3 times higher chromate adsorption capacity than the unmodified CNF membrane. This observation can be explained by the higher concentration of thiol groups in the m-CNF membrane. The higher adsorption of Cr (VI) in the m-CNF membrane can be attributed to the formation of Cr(VI)-thiolate complex ion on the surface of m-CNF. There could be several possible formations of $[CrO_3(SR)]^-$. These formations include the coordination of Cr(VI) with the thiolato or amido donors from the cysteine-functionalized cellulose. In addition, reduction of Cr(VI) to $Cr^{3+}$ may also take place in the presence of thiol groups, whereby the negatively-charged free carboxylates (<0.7 mmol/grams) on the cellulose surface can adsorb the reduced $Cr^{3+}$ at increasing pH by charge interactions and increase the adsorption capacity. However, with the increase in pH value, the Cr(VI)-thiolate complex formation is inhibited, leading to a lower amount of adsorption.

Figure 9B:
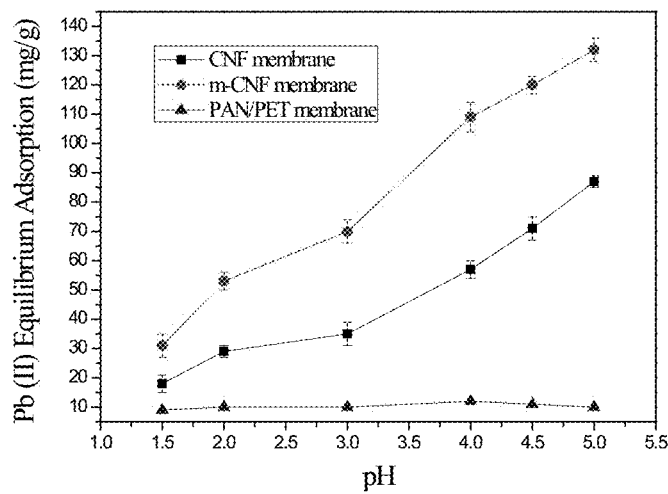

The Pb (II) adsorption studies were carried out using a m-CNF nanofibrous composite membrane, CNF nanofibrous composite membrane, and an unmodified PAN membrane (FIG. 9B). Only the pH range from 1.5 to 5.5 was examined because lead hydroxides precipitate above pH=6. The adsorption amount of Pb (II) measurement was done following the same method as Cr(VI) adsorption, while the concentration was determined by UV optical adsorption at 523 nm. The m-CNF membrane showed the best adsorption efficiency (133±2.5 mg/g) among the three. It is believed the formation of Pb(II) thiolate occurred between —SH and Pb (II). This adsorption capacity increased with increasing pH between 1.0 and 5.5 according to the preference of metal complex formation. As for the CNF membrane without the thiol modification, the system still showed decent adsorption efficiency, likely due to the charge attraction between negatively charged carboxylate groups on the cellulose surface and positively charged Pb (II) ions. At higher pH values, more —COOH groups could be dissociated into $COO^-$ groups, indicating higher adsorption capacity of Pb (II) ions due to charge interactions. In contrast to the above two systems, the control membrane (electrospun PAN scaffold on the PET nonwoven support) exhibited very small adsorption capability (<8 mg $Pb^{2+}$/grams membrane).

Example 9

Figure 10:
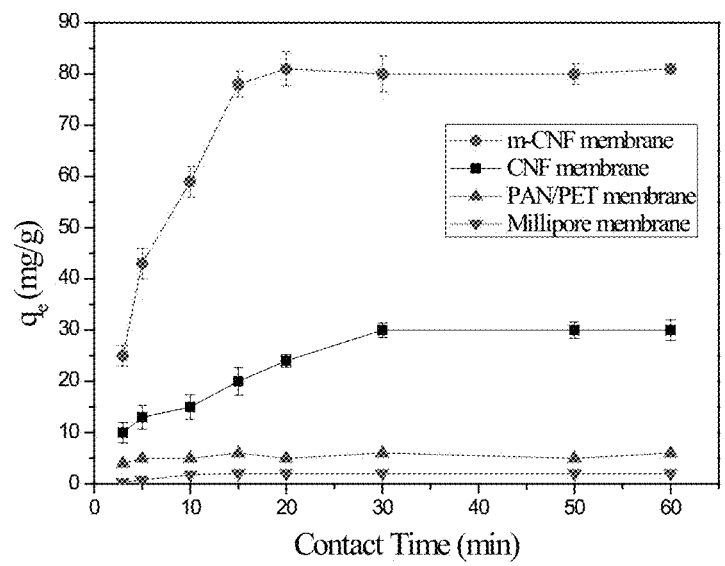
FIG. 10 is a graph depicting chromium adsorption of a membrane of the present disclosure as a function of contact time (m-CNF membranes), compared with unmodified membranes (CNF membranes), substrates without the membranes of the present disclosure (PAN/PET membranes), and commercially available filters (Millipore membranes)

In typical metal removal practices, the adsorption contact time is an important factor as it directly affects the membrane lifetime and the adsorption time efficiency. FIG. 10 illustrates the results from experiments carried out under the same conditions as static adsorption at pH=4.0. A commercial MF membrane (Millipore-SLFH 025NS with 450 nm pore size, which is a hydrophobic fluoropore polytetrafluoroethylene (PTFE) membrane), and a PAN/PET composite membrane, were also used for comparison. It was found that the m-CNF nanofibrous composite membrane reached the maximum adsorption of 80 mg/gram for Cr (VI) within 15 minutes, due to the fast formation of Cr-thiolate complex, whereas the CNF nanofibrous composite showed a moderate Cr(VI) adsorption capacity of about 30 mg/gram that could be attributed to some affinity interactions between CNF and metal ions. A residence time of about 30 minutes was required to reach the equilibrium. In contrast, the PAN/PET composite membrane and the chosen Millipore membrane showed very little adsorption (<3 mg Cr(VI)/grams membrane) because of lack of interactions between the membrane and metal ions.

Figure 11:
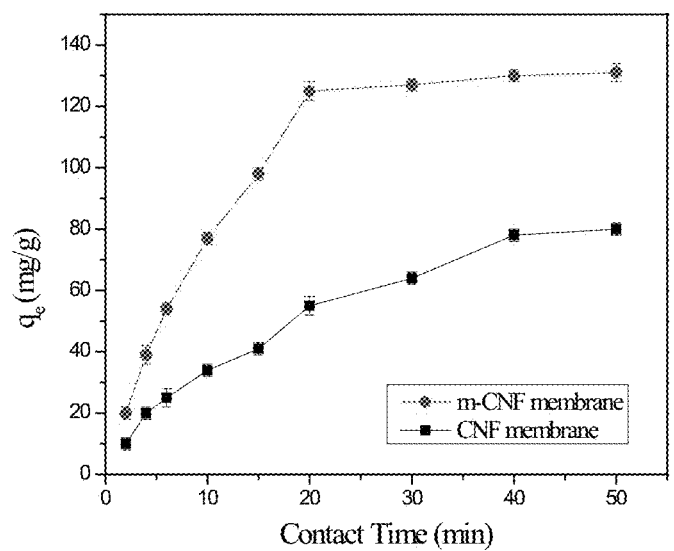
FIG. 11 is graph depicting Pb(II) adsorption of a membrane of the present disclosure as a function of contact time (m-CNF) compared with a non-modified membrane (CNF)

Static Pb (II) adsorption measurements as a function of time for m-CNF and CNF nanofibrous composite membranes were also carried out at pH=4.0 (FIG. 11). Two interesting observations were made, i.e., the m-CNF membrane exhibited a faster adsorption process and larger adsorption capacity over the CNF membrane. To be specific, the m-CNF membrane could adsorb 125 mg/gram of Pb (II) within 20 minutes, while it took the unmodified CNF membrane 40 minutes to reach equilibrium adsorption of 75 mg/gram Pb ions. One possible explanation is that the formation of Pb-thiolate complex through the chelating reaction of —SH and Pb(II) was very fast and strong. In contrast, the charge interactions between the negatively charged —$COO^-$ on CNF and the positively-charged lead ions were considerably weaker. Neither PAN/PET membranes (without m-CNF or CNF) nor Millipore microfiltration membranes showed any lead ion adsorption capacity.

Figure 12A:
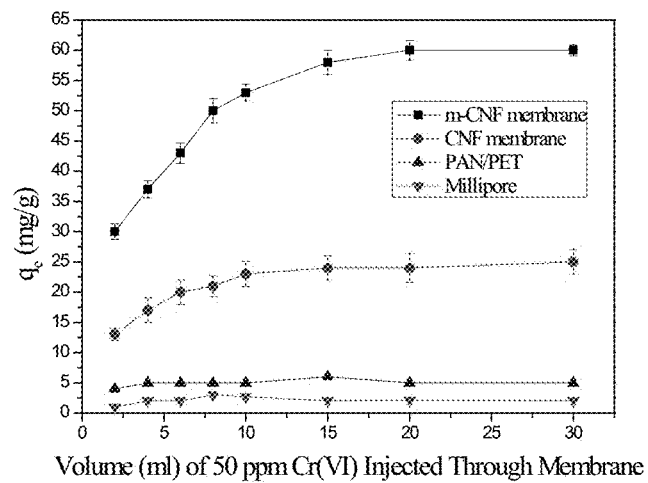
FIGS. 12A and 12B are graphs depicting dynamic adsorption characteristics of membranes of the present disclosure, with FIG. 12A showing the results for Cr(VI) adsorption for membranes of the present disclosure (m-CNF membranes), compared with unmodified membranes (CNF membranes), substrates without the membranes of the present disclosure (PAN/PET membranes), and commercially available filters (Millipore membranes), and FIG. 12B showing the results for Pb(II) adsorption for membranes of the present disclosure (m-CNF membranes), compared with unmodified membranes (CNF membranes)
Figure 12B:
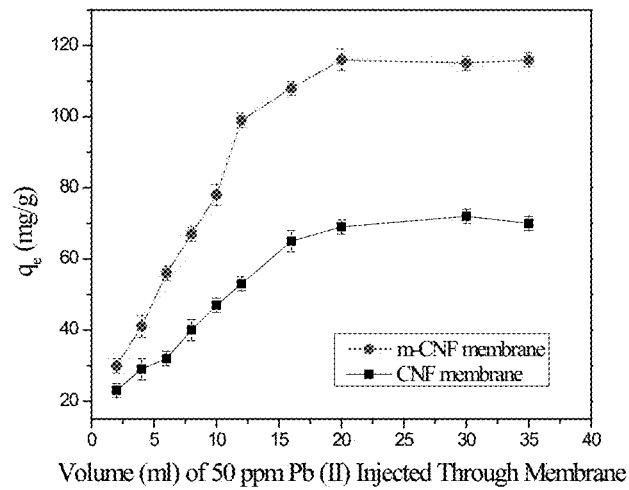

Dynamic adsorption experiments involved the quantitative analysis of metal ions adsorbed on the membrane under a constant flow condition at an optimum pH value. About 50 ppm of chromate or lead ion solutions were injected through a membrane disc (2-inch diameter) at 2 mL/minute. It was found that at pH=4.0, the most efficient adsorption of Cr(VI) occurred over the first 15 ml for the m-CNF membrane, where 60 mg Cr(VI)/g of membrane was adsorbed (FIGS. 12A-12B). For Pb(II) adsorption at pH=5.0, the most efficient adsorption occurred over the first 20 ml for m-CNF membranes, where 115 mg Pb(II)/g membrane was adsorbed, i.e., about 83% of the Pb(II) adsorption capacity in static adsorption was reached. Very low dynamic adsorption values were observed for the PAN/PET composite membrane and the Millipore filter.

Figure 13A:
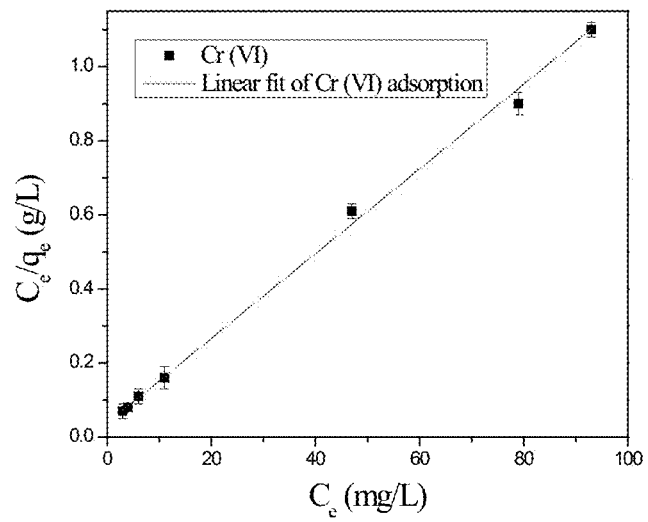
FIGS. 13A-13B are graphs depicting adsorption isotherms of Cr(VI) (FIG. 13A) and Pb(II) (FIG. 13B) for the membranes of the present disclosure.
Figure 13B:
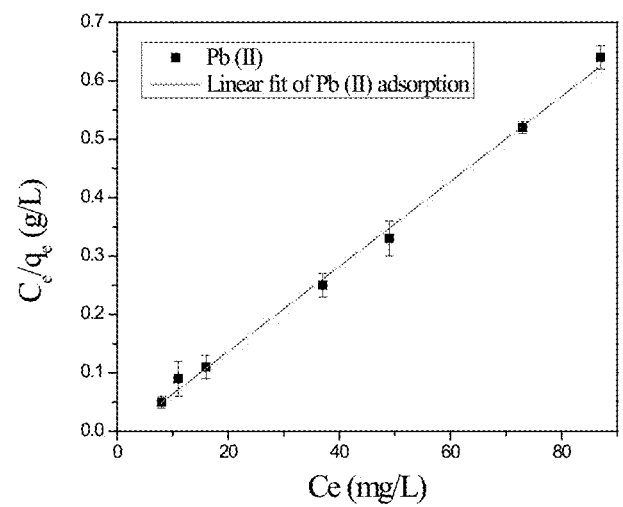

Adsorption isotherms were used to illustrate the interactions between adsorbents and adsorbates, as well as the adsorption capacity of adsorbents. To evaluate the adsorption isotherms for the m-CNF membrane, the Langmuir adsorption model was used to calculate the adsorption capacity. The adsorption isotherms for both Cr(VI) and Pb(II) ions were evaluated using the following equation:

$$\frac{C_e}{q_e} = \frac{C_e}{q_m} + \frac{1}{bq_m} \quad (5)$$

where $q_e$ is the amount of metal ions adsorbed on the membrane at equilibrium (mg/g), $C_e$ is the equilibrium metal ion concentration in solution (mg/L), $q_m$ is the maximum adsorption of the metal ions (mg/g), and b is the Langmuir constant (L/mg). Based on Equation 5, the value of $C_e/q_e$ was plotted against $C_e$ for both Cr(VI) and Pb(II) adsorption isotherms, with the results illustrated in FIG. 13. It was seen that both plots exhibited a straight line with the slope representing $1/q_m$ and the intercept representing $1/bq_m$. The b value (Langmuir constant) also referred to the corresponding binding energy of adsorption, whereby a higher b value meant more binding affinity between adsorbents and adsorbates. Table 2 illustrates the parameters (i.e., the maximum adsorption, Langmuir constant and correlation coefficient) extracted from the adsorption isotherms of Cr(VI) and Pb(II) ions for the m-CNF membrane. Based on the results in FIG. 13 and Table 2, both lead and chromium adsorption closely followed the Langmuir Model with high correlation coefficient of 0.997 and 0.998, respectively, and large adsorption capacity (87.5 mg/g for Cr (VI) and 137.7 mg/g for Pb (II) at their optimum adsorption pH values).

TABLE 2

The parameters extracted from the adsorption isotherms of Cr(VI) and Pb(II) ions for the m-CNF membrane

| Target Metal | $q_m$ (mg/g) Maximum adsorption | b (L/mg) Langmuir constant | $R^2$ Correlation coefficient |
|---|---|---|---|
| Cr (VI) | 87.5 | 0.308 | 0.997 |
| Pb (II) | 137.7 | 0.783 | 0.998 |

Example 10

The above adsorption results were compared with other modified cellulose-based adsorbents (Table 3). Under similar test conditions in terms of optimum pH and room temperature, the m-CNF membranes demonstrated higher adsorption capacity than the chosen adsorbents. The format of m-CNF membranes was also designed to be a separation system. In contrast, as most of the chosen adsorbents were designed to adsorb metal ions prior to filtration, they required an additional separation step for water purification.

TABLE 3

Comparisons of Cellulose based Adsorbents

| Metal Ions | Adsorbents | Adsorption Capacity(mg/g) | Initial Metal Conc.(ppm) | Optimum pH | Temperature (° C.) | Adsorption Model |
|---|---|---|---|---|---|---|
| Cr(VI) | m-CNF Membrane | 87.5 | 50 | 4.0 | 22 ± 2 | Langmuir |
| | Cellulose Microsphere-based Adsorbent | 78 | 100 | 3.5 | Room Temperature | Langmuir |
| | Sulfamate-Bacterial Cellulose | 22.73 | 100 | 2.3 | 20 | Langmuir |
| Pb(II) | m-CNF Membrane | 131 | 50 | 5.0 | 22 ± 2 | Langmuir |
| | Diethylenetriamine-bacterial Cellulose | 31.41 | 100 | 4.5 | Room Temperature | Langmuir/ Freundlich |
| | Ethylenediamine Modified Cellulose | 50.0 | 200 | 6.0 | Room Temperature | Langmuir/ Freundlich |

Example 11

As high regeneration efficiency is an important parameter in membrane performance, the thiol modified CNF membrane was subjected to a desorption and reuse test. In this study, aqueous solutions of EDTA (0.05 M) were selected to remove lead ions from the used membrane, as EDTA ligands have a very strong affinity binding with lead ions. For Cr(VI) desorption, HCl (2 M) was applied to release the metal ions from the m-CNF membrane surface. This is because at very low pH conditions, the membrane uptake of Cr(VI) ions was low. The results of this study are shown in Table 4, demonstrating the m-CNF membrane were able to retain greater than 93% of their initial adsorption capacity after three use/regeneration cycles. In other words, even after being used and regenerated for 3 cycles, the m-CNF membrane still possessed 93% of the original Cr(VI) adsorption capacity and 95% of the original Pb(II) adsorption capacity. It is important to note that as the fabrication cost for this membrane system was relatively low, the membrane may be treated as disposable under certain practical conditions when the regeneration cost is high or not accessible.

TABLE 4

Membrane regenerate efficiency

| | Regenerate Efficiency | |
|---|---|---|
| Recycled Times | Cr(VI) | Pb(II) |
| $1^{st}$ | 96 ± 3% | 97 ± 1% |
| $2^{nd}$ | 93 ± 2% | 95 ± 3% |
| $3^{rd}$ | 93 ± 3% | 95 ± 2% |

Membrane regeneration studies were carried out after static and dynamic adsorption tests, by first washing with DI water (about 10 ml). The Cr (VI) adsorbent membrane was subsequently stirred in about 50 ml 1 M HCl solution for about 1 hour, whereas the Pb (II) adsorbent membrane was treated with about 50 ml 0.1M ethylenediaminetetraacetic acid (EDTA) solution for about 1 hour. These membranes were then washed by injecting about 10 ml water through the membrane body. After this desorption treatment, the membrane was then used for the next cycle of adsorption tests. Desorption and adsorption processes were repeated for three cycles under the same static adsorption test condition at optimum pH to yield the membrane regeneration efficiency using the equation 6 below:

$$\text{Membrane Regeneration Efficiency} = C_2/C_1 100 \qquad (6)$$

where $C_1$ refers to fresh membrane adsorption capacity, $C_2$ refers to reused membrane adsorption capacity.

In conclusion, ultra-fine oxidized cellulose nanofibers (diameter about 5 nm) with substantial amounts of carboxylate groups (1.6 mmol/g) were produced by the TEMPO oxidation method. These oxidized cellulose nanofibers (CNF) were subsequently coupled with cysteine to afford thiol-functionalized fibers (surface thiol concentration 0.9 mmol/g).

Figure 14:
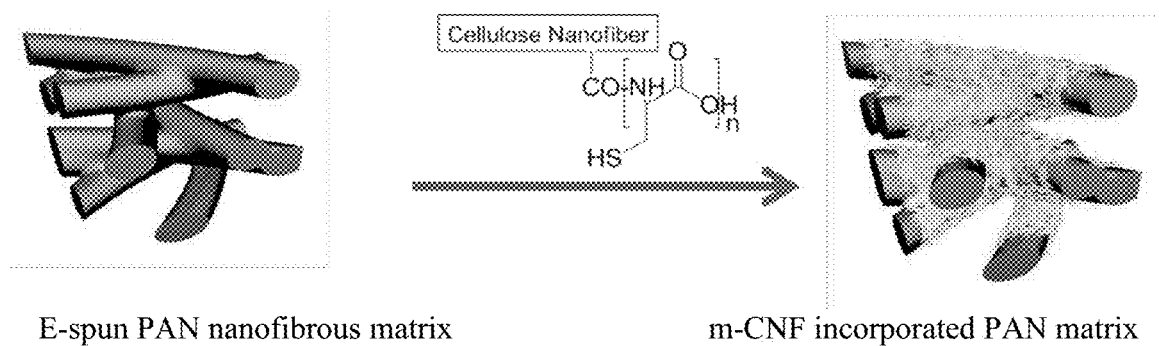
FIG. 14 is a schematic depicting infusion of thiol-functionalized fibers of the present disclosure into a PAN matrix to form a composite filter.

Oxidized cellulose nanofibers (CNF), embedded in an electrospun polyacrylonitrile (PAN) nanofibrous scaffold, were grafted with cysteine to increase the adsorption capability for chromium (VI) (CR(VI)) and lead (II) (Pb(II)). Thiol-modified cellulose nanofibers (m-CNF) were characterized by titration, FT-IR, energy dispersive spectroscopy (EDS) and SEM techniques. Static and dynamic Cr(VI) and Pb(II) adsorption studies of m-CNF nanofibrous composite membranes were carried out as a function of pH and of contact time. A high flux microfiltration filter (1000 L/m² h/psi) was produced. The results indicated these membranes exhibited high adsorption capacities for both Cr(VI) (87.5 mg/g) and Pb(II) (137.7 mg/g) after a short time (15-20 minutes) due to the large surface area and high concentration of thiol groups (0.9 mmol of —SH/gram m-CNF). The morphology and property of m-CNF nanofibrous composite membranes was found to be stable, and they could be used and regenerated multiple times with high recovery efficiency (>93%). FIG. 14 includes SEM images of the PAN matrix before and after incorporation of the modified cellulose nanofibers therein, as well as the scheme for reaction to incorporate the modified cellulose nanofibers in the PAN matrix.

Example 12

Natural polysaccharide chitin nanofibers, prepared with a series of chemical and mechanical treatments, were used as an absorbent material for arsenic (As(III)) removal. The dimensions of chitin nanofibers, determined by small-angle X-ray scattering (SAXS), were about 6 nm in thickness, 24 nm in width and a few hundred nanometers in length. The chemical/mechanical treatment enabled the chitin nanofiber surface to be charged, thus facilitating the dispersion of nanofibers in aqueous suspension at neutral pH. The large amount of amine groups (1.7 mmol/g) on the nanofiber surface provided opportunities for further modifications, such as formation of amide bonds.

L-Cysteine (>97% purity), N-hydroxysuccinimide (NHS), N-(3-dimethylaminopropyl)-N'-ethylcarbodiimide hydrochloride (EDC), sodium hydroxide (NaOH), sodium hypochlorite (NaClO), sodium chlorite ($NaClO_2$), sodium arsenite ($Na_3AsO_3$), phosphate buffer, practical grade chitin powder (poly-(1-4)-β-N-acetyl-D-glucosamine) extracted from crab and shrimp shells, and chitosan (medium molecular weight was 103 k Da; degree of deacetylation was 75%-85%) were purchased from Sigma-Aldrich. Ellman's Reagent (DTNB (5,5'-dithio-bis-[2-nitrobenzoic acid])) was purchased from Thermo Scientific. Dialysis tubing 44 mm×28 mm with molecular weight cut off (MWCO) of 14 k Da was purchased from Fisher Science Education. 0.22 µm Pore-size Millipore syringe filters (SLGP033RS) were purchased from EMD Millipore.

About 10 grams of dried chitin powder from shrimp shells was first dispersed in about 500 ml of about 2 M HCl and stirred at room temperature for about 6 hours to remove mineral salts (e.g. calcium carbonate). The slurry was then treated by vacuum filtration, where the recovered solid was washed with DI water to remove HCl until the pH value became neutral. Next, the HCl-treated chitin was dispersed in about 500 ml of 30% NaOH and refluxed at about 80° C. for about 10 hours to remove proteins and deacetylate the sample.

The slurry was separated again by vacuum filtration to recover the acid/base-treated product, which was further treated by addition of an appropriate amount of NaClO (about 5 mmol of about 25 wt % NaClO per gram of chitin nanofiber), with overnight stirring, vacuum filtration and DI water washing (until the pH value reached about 7). Subsequently, the slurry was treated with about 30 wt % NaOH aqueous solution, heated again at about 80° C. to remove leftover proteins and allow the deacylation reaction to occur. The final product was purified by using a dialysis bag (MWCO 140 k) in a 5 L water tank.

DI water was changed about every 2 hours until the conductivity of the solution was equal to water (about 120 µS/cm). Chitin slurry (about 2 grams, >60 wt % chitin) purified from the dialysis bag was dispersed in about 100 grams of water, where the mixture was sonicated with a homogenizer for about 15 minutes. The concentration of chitin stock solution (about 1 wt %) was determined by TOC-500. Part of the solution was freeze-dried for further analysis.

Figures 15A, 15B:
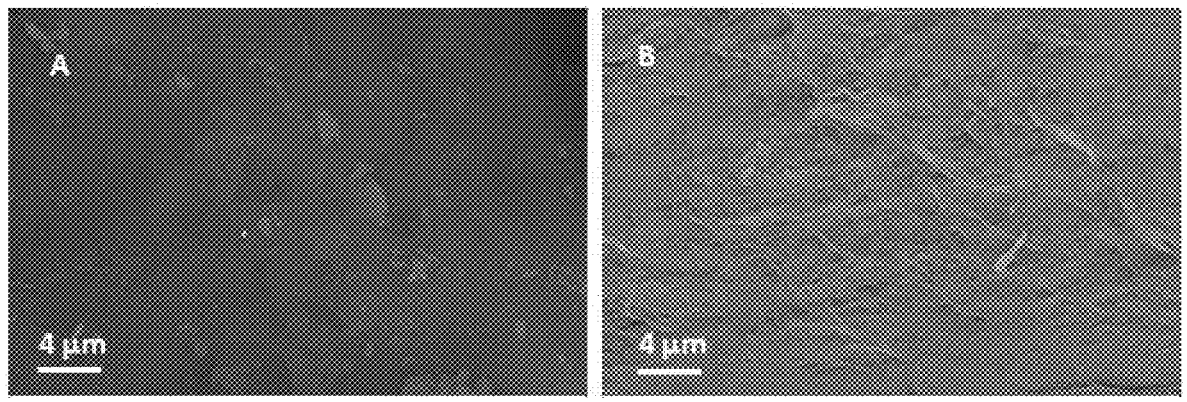
FIGS. 15A and 15B are SEM images of raw chitin (FIG. 15A) and a chitin nanofibrous network after chemical treatments in accordance with the present disclosure (FIG. 15B)

The series of chemical and mechanical treatments, as described above, were applied to extract chitin nanofibers from the raw chitin powder of shrimp shells. In these treatments, HCl was used to remove the minerals (mainly calcium carbonate), $NaClO_2$ was used to bleach the pigment buried in the woven network structure of raw chitin, and NaOH was used to remove the protein layers wrapping around the chitin nanofibers. FIG. 15(A) shows the SEM image of the raw chitin powder, where the sample surface was found to be smooth. This indicated that the raw chitin sample was covered by proteins and no fibrous structure could be detected. This observation was also consistent with the EDS results, which showed a large amount of calcium due to the existence of calcium carbonate. FIG. 15(B) illustrates the SEM image of the chitin sample after the first step acid/base treatment, where a fibrous network structure was clearly visible.

It was interesting to note that the acid/base-treated chitin fibrous scaffold (in FIG. 15(B)), purified from the vacuum filtration step, could not be dispersed homogeneously in water at neutral pH. For example, it was observed that acid/base-treated chitin nanofibers formed a gel-like precipitate in aqueous suspension. This aggregation behavior could result from association of hydrophobic portions of chitin nanofibers as well as inter-fibrillar hydrogen bonding among the chitin nanofibers. The effects of subsequent chemical treatments on the dispersion of chitin nanofibers showed that when the pH level was decreased, the deacylated $C_2$ amine groups on the chitin nanofibers surface could be cationized and electrostatic repulsion from the positively charged groups could facilitate the dispersion process. Thus, after the NaClO treatment followed by dialysis purification, chitin nanofibers became much better dispersed in the aqueous suspension even at neutral pH. This is because some hydroxyl groups at the $C_6$ positions might be oxidized into carboxylate groups, creating a water soluble fraction due to the polyuronic acid Na salts on the chitin surface. After the NaOH deacetylation treatment, where hydrophilic amine groups were created, further facilitating the dispersion process. The concentration of the sample (3) suspension was 0.5 wt %, as confirmed by TOC, where the partial transparency of the solution suggested incomplete dispersion. However, after another step of mechanical disintegration, the dispersion of chitin nanofibers in DI water could be further improved, indicating that the most of chitin nanofibers might be in the dispersed state.

Example 13

To prepare thiol-modified chitin nanofibers, about 100 grams of chitin nanofiber suspension (about 0.5 wt %) from the oxidant treatment described above in Example 12 was mixed with N-hydroxysuccinimide (NHS) (about 0.16 grams, about 1.4 mmol), 1-ethyl-3-[3-dimethylaminopropyl] carbodiimide hydrochloride (EDC) (about 0.24 grams, about 1.3 mmol) and cysteine (about 0.5 grams, about 4.1 mmol). The reaction was allowed to proceed for about 24 hours at room temperature.

The mixture was subsequently centrifuged at a speed of about 5000 rpm (with a relative centrifugal force of about 2200×g), and the supernatant was poured off. The slurry of modified nanofibers was then re-suspended in DI water, where the washing and centrifugation processes were repeated several times until the conductivity in the centrifuge tube became the same (about 120 µS/cm). This indicated that only chitin nanofibers remained in the suspension, with an overall yield of about 75 wt % (about 400 mg) as determined by TOC-500.

The amount of amine groups on the surface of the resulting chitin nanofibers could be quantified by using an electric conductivity method. During the test, about 6 ml of 0.9 wt % chitin suspension was first diluted with DI water to a total volume of about 50 ml. About 3 ml of about 0.1 M HCl was subsequently added to this suspension to adjust the pH to a value between about 2 and 3.

Then, 50 µl aliquots of about 0.1 M NaOH were added continuously at the rate of one aliquot every 20 seconds into the suspension until a pH value of about 11 was obtained, while the conductivity of the suspension was measured. The amine content was determined from the conductivity and the pH curves.

In the aforementioned chitin nanofiber preparation steps, different functional groups were generated, which served as potential sites for direct applications or further modification reactions. Hence, the quantitative analysis of different functional groups on the surface of chitin nanofibers after each chemical treatment was important and was carried out as follows.

The primary reasons for the initial acid (HCl) and base (NaOH) treatment steps were to remove mineral and protein impurities present in the fibers. After the isolation and purification process, though the resulting nanofibers could not be homogeneously dispersed in water, a notable amount of C2 amino groups (ca. 0.8 mmol per gram of chitin) were detected by titration on the fiber surface. Subsequently, after the NaClO oxidization treatment, some C6 hydroxyl groups were converted into carboxylate groups, yielding a concentration (carboxylate) of 0.05 to 0.1 mmol/g determined by a conductivity titration method. After the strong base (30 wt % NaOH) treatment in boiling conditions, the C2 acetylamide deacetylation reaction took place, yielding a large amount of primary amine groups (ca. 1.7 mmol/g) on the nanofibers. As a result, a high concentration of the C2-amino groups was created. It is also conceivable that the second long term treatment of NaOH generated more nanofibers from the residual protein matrix as well as deacetylated more C2-acetylamide groups.

Since the amine group on the chitin surface was primarily responsible for the subsequent grafting reaction, and thus the final adsorption performance, the degree of deacetylation on the chitin nanofiber surface was measured. Chitin macromolecules include n-moles of N-acetyl glucosamine (Glc-NAC) and m-moles of glucosamine ($GlcNH_2$) units. The difference between chitin and chitosan macromolecules depends on the m and n ratios. When n>>m, the system is considered as chitin, while n<<m, the system is considered as chitosan. The degree of deacetylation of chitosan ($f_D$) can be given by:

$$f_D = \frac{m}{m+n} \qquad (7)$$

and the chitosan monomer average weight ($M_{cs,mon}$) can be given by:

$$M_{cs,mon} = MW_m \times (1-f_D) + MW_n \times f_D \qquad (8)$$

Thus, the concentration of the amine groups in the chitosan molecule can be calculated as $$C_{NH2} = \frac{f_D}{M_{cs,mon}} = \frac{f_D}{MW_m \times (1-f_D) + MW_n \times f_D} \qquad (9)$$

As a result, the amine concentration in 100%-deacetylated chitosan should be 6.2 mmol/g based on Equation (9). Using the electrical conductivity titration measurement, it was found that there was only 1.7 mmol of amine per gram of chitin in the nanofiber suspension. The reason that the number of the amine group in fully deacetylated chitosan was much larger than that of chitin nanofibers measured experimentally may be because the nanofibers (with dimensions from 5 nm-20 nm as determined by SAXS) were aggregates of multiple folded polysaccharide chains. In this case, even though the surface of the chitin nanofibers was deacetylated, a substantial fraction of unmodified chitin repeating units were hidden within the fibers, where these sites could not be detected by conductivity titration.

After the reaction with cysteine, the thiol-modified chitin nanofiber suspension was purified by dialysis (using a dialysis bag with MWCO of 140 k Da against DI water) until no carbon could be detected by the TOC analysis. Ellman's Reagent (DTNB (5,5'-dithio-bis-[2-nitrobenzoic acid])), was used to determine the amount of thiol groups on the surface of cellulose nanofibers in aqueous suspension. This method was also used to determine the thiol groups on the surface of chitin nanofibers in aqueous suspension.

During the test, DTNB reacted with thiols to release 2-nitro-5-thiobenzoate ($NTB^-$), which was subsequently ionized to the yellow colored dianion ($NTB^{2-}$) at pH of about 8. Thiol groups were assayed by using the molar adsorption coefficient of $NTB^-$ (14,150 L $mol^{-1}cm^{-1}$ at about 412 nm).

About 50 mg of DTNB was dissolved in about 10 ml of phosphate buffer (pH of about 8). About 3 mL of about 0.1 wt % cysteine-modified chitin suspension was then mixed with about 2 mL of phosphate buffer and diluted with about 5 mL of DI water. About 0.02 mL of DTNB/buffer solution was subsequently mixed with about 3 mL of thiol-modified chitin/buffer suspension in a 1 cm cuvette and the absorbance at about 412 nm was measured after about 5 minutes of mixing.

The same method as that in the thiol determination on modified cellulose nanofibers was used to draw a calibration curve with a 0.1 wt % chitin nanofiber aqueous suspension as the control sample. The thiol concentration calculation was carried out using the following equation (10).

$$C_0 = \frac{A}{\varepsilon \cdot b} D \quad (10)$$

In the above equation, $C_0$ refers to the —SH concentration, A represents the absorbance at 412 nm, b is the light travel distance of spectrophotometric cuvette (1 cm), c is the extinction coefficient (14150 L mol$^{-1}$cm$^{-1}$) at the testing condition, and D is the dilution factor (i.e., 1.007), which is the total chitin suspension and DTNB/buffer volume divided by the volume of the chitin suspension.

The surface morphology of raw chitin and chitin nanofibers after the first acid/based treatment was investigated by SEM (LEO 1550 with a Robinson backscatter detector and a 20 kV Schottky filed emission gun). All samples were freeze-dried and treated by a sputter coater with platinum in vacuum for about 45 seconds. The chosen SEM instrument was equipped with an energy dispersive spectrophotometer (EDS) (EDAX Sapphire PV7715/89-ME). The EDS data were subsequently analyzed with Iridium Ultra software (iXRF).

The chitin nanofiber (and thiol-modified chitin) samples were also analyzed by transmission electron microscopy (TEM). To prepare the samples for TEM measurements, the nanofiber aqueous suspension was first diluted to about 0.01 wt % and subsequently sonicated by a homogenizer. The resulting suspension was cast on a carbon-coated TEM grid, and then stained with about 0.5 ml of about 2 wt % uranyl acetate prior to imaging with an FEI Bio TwinG$^2$ at an accelerating voltage of 120 kV.

After the series of chemical treatments and mechanical disintegration, the surface of chitin nanofibers could be substantially functionalized. With deacetylation by NaOH, the amino group could be generated at the C2 position. If a sufficient amount of primary amines was present, chitin nanofibers could be well dispersed in the aqueous suspension due to the cation formation of amine under acidic conditions. As mentioned earlier, the oxidation reaction by NaClO at the C6 position could convert the hydroxyl group to the carboxylate group, which might further facilitate the separation of nanofibers due to the electrostatic repulsions of negatively charged ions (carboxylates).

Figure 16:
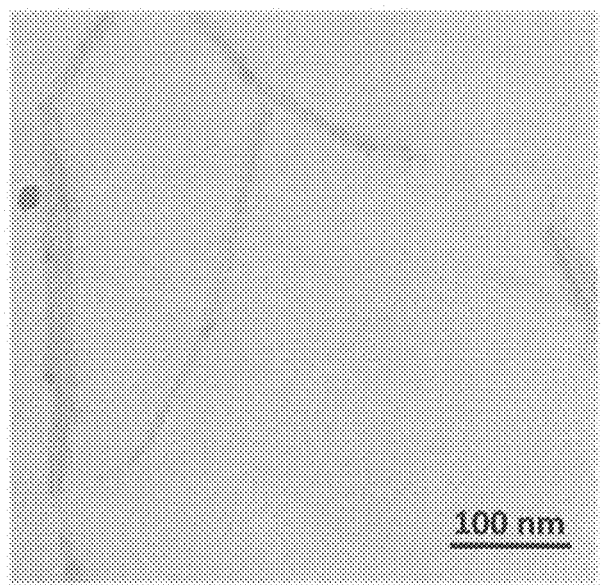
FIG. 16 is a TEM image of chitin nanofibers after an acid/base and oxidation treatment of the present disclosure (the sample was stained with 2.0 wt % uranyl acetate solution before imaging)

The well-dispersed state of chitin nanofibers created by the chosen chemical and mechanical treatments can be indirectly observed by the TEM measurement of samples cast from the nanofiber suspension. A TEM image is shown in FIG. 16, where the chitin nanofibers were 10-30 nm in width. A close examination indicated that some regions of the fibers were twisted, which indicated that these were not really round fibers but nano-scaled ribbons, as has been observed for cellulose nanofibers.

A series of 0.05 wt % to 0.7 wt % chitin nanofiber suspensions were measured in aqueous solution by small-angle X-ray scattering (SAXS) over a large angular range at Beamline X9 in National Synchrotron Light Source (NSLS), Brookhaven National Laboratory (BNL). The chosen experimental procedures were demonstrated in a previous SAXS study dealing with the structural analysis of cellulose nanofibers in aqueous suspensions.

In this study, three scans were taken (the scan time was about 30 seconds) for each sample, where for each scan, a 20 μl chitin nanofiber aqueous suspension was automatically injected into a glass capillary (diameter 1 mm) positioned in a vacuum chamber. In this instrument, the chosen X-ray wavelength was about 0.0918 nm, and the detector was PILATUS 300K and the sample-to-detector distance was about 3.2 meters.

During the data collection process, the suspension sample was circulating through the capillary to minimize the radiation damage. A Python-based software package was used to process the preliminary data, converting the two-dimensional images into one-dimensional scattering profile, blocking unnecessary pixels and subtracting the buffer and background scattering.

Besides the direct observation of nanofibers using electron microscopy, the solution small-angle X-ray scattering (SAXS) method was used to analyze the shape, size and size distribution of chitin nanofibers in suspension. This method has been found to be useful for structural characterization of biomacromolecules in solution. The analytical scheme used to interpret the scattering data from chitin nanofibers was based on an earlier study of oxidized cellulose nanofibers in suspension, where a ribbon model was found to best fit the scattering curves.

In this data analysis, since the fiber length (a few hundred nanometers) was out of the SAXS detection range (0.5-100 nm), the fiber length was considered as infinitely long, and only the cross-sectional dimensions were estimated from the model. In view of the nanofiber polydispersity shown in the TEM images, two polydisperse models, the cylinder model and the ribbon model, were considered to best fit the experimental data using the NonlinearModelFit function in MATHEMATICA® software system (Wolfram Research, Champaign, Ill.). In the cylinder model (Equation 11), $R_0$ is the number average radius of the circular cross-section and σ is the standard deviation of the Gamma distribution of the radius R. In the ribbon model (Equation 12), it is assumed that both the thickness a and the width b fit the Gamma distribution, and $a_0$, $b_0$, $\sigma_a$ and $\sigma_b$ are the number averages and standard deviations of the thickness and width of the cross-section, respectively. In both equations, s is the modulus of scattering vector (s=2 sin θ/λ).

$$\frac{I(s)}{L} = \frac{1}{2s}\int_0^\infty (\pi R^2)^2 \left[\frac{J_1(2\pi sR)}{\pi sR}\right]^2 \frac{1}{\Gamma\left[\left(\frac{R_0}{\sigma}\right)^2\right]} \frac{\left(\frac{RR_0}{\sigma^2}\right)^{\left(\frac{R_0}{\sigma}\right)^2}}{R} \exp\left[-\frac{RR_0}{\sigma^2}\right] dR \quad (11)$$

$$\frac{I(s)}{c} = \frac{1}{4\pi^2 s^3}\left\{1 - Re\left[\left(1 + 2i\pi s\frac{\sigma_a^2}{a_0}\right)^{-\left(\frac{a_0}{\sigma_a}\right)^2}\right]\right\} \quad (12)$$

$$(b_0^2 + \sigma_b^2)\,_3F_2\left(\frac{1}{2}, 1 + \frac{b_0^2}{2\sigma_b^2}, \frac{3}{2} + \frac{b_0^2}{2\sigma_b^2}; \frac{3}{2}, 2; -\frac{4\pi^2 s^2 \sigma_b^2}{b_0^2}\right)$$

Figure 17:
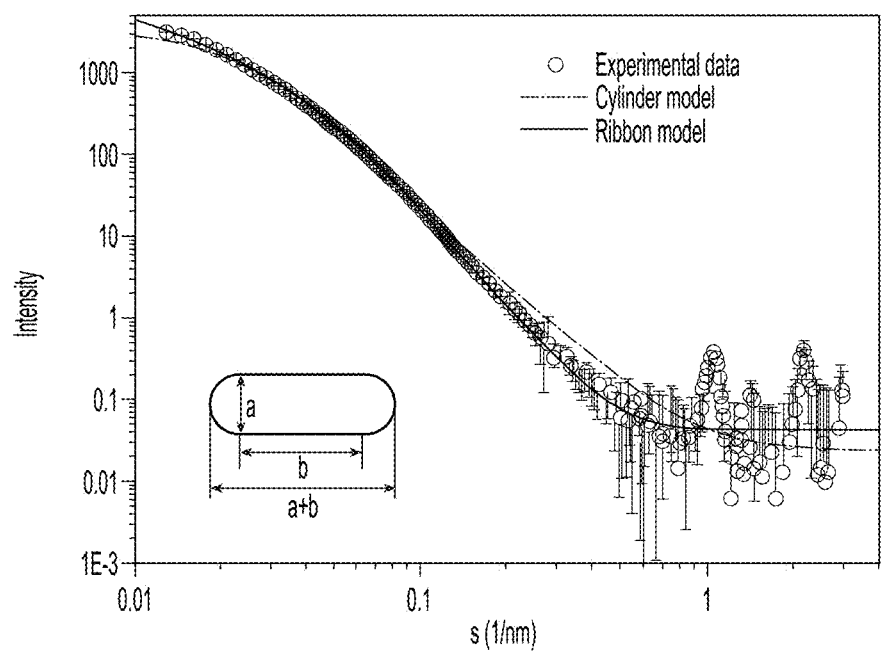
FIG. 17 is a graph of a comparison between the best-fit polydisperse ribbon model, polydisperse cylinder model and the experimental data for nanofibers of the present disclosure (the lower-left sketch shows the cross-section shape of the ribbon model)

For the best-fit cylinder model, the size-weighted average radius $R_W$ was found to be 7.7 nm and the standard deviation $\sigma_R$ was 3.9 nm. For the best-fit ribbon model, the fitted size-weighted parameters were: $a_w=5.7$ nm, $\sigma_a=3.5$ nm, $b_w=18.0$ nm, $\sigma_b=5.8$ nm (thus the ribbon width $a_w+b_w=23.7$ nm, the corresponding deviation $\sigma_{a+b}=7.3$ nm). The coefficients of determination, $R^2$ (the closer the value is to 1, the better the fit between the model and experimental data), for the cylinder model and ribbon model were 0.9913 and 0.9995, respectively. The higher $R^2$ value of the ribbon model indicated a better fit between the model and the experimental data, and the superiority of the ribbon model was more obvious in the scattering intensity plots comparison (FIG. 17). The characteristic diffraction reflections from crystalline chitin can be seen in the high-s region (s=1.05, 1.43 and 2.16 $nm^{-1}$).

The average ribbon width (a+b) (about 23 nm) determined from the SAXS analysis was comparable to the sizes of the single nanofibers (about 20 nm) that appeared most frequently in the TEM images (FIG. 16). The discrepancy of the results obtained from these two measurements could be explained by the distinctive features of the two techniques: TEM allowed direct visualization of a limited number of particles, and the possible aggregation during the sample preparation could influence the particle size distribution; while SAXS provided an in situ statistical analysis of the structural information from all the particles in the system.

Figure 18:
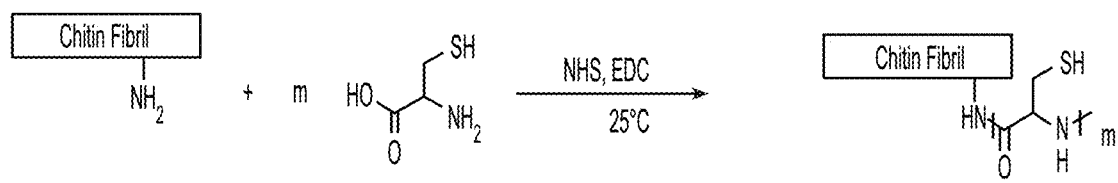
FIG. 18 is a schematic showing the reaction of cysteine with chitin to produce modified nanofibers of the present disclosure.

Thiol-functionalized chitin nanofibers were created by grafting cysteine molecules onto the fiber surface through formation of amide bonds between the cysteine carboxylate groups and the amine groups from chitin. The reaction occurred in the presence of NHS and EDC, which activated the carboxylate groups to react with the amine groups (FIG. 18). The modification was carried out at three different molar ratios between chitin-amine ($[NH_2]=1.7$ mmol/g) and cysteine: 1:2, 1:6, 1:10. The maximum thiol concentration on the chitin nanofibers surface (1.1±0.1 mmol/g), determined by the Ellman's reagent method, was observed at both 1:6 and 1:10 ratios.

Fourier transform infrared (FT-IR) spectroscopy with attenuated total reflectance (ATR) accessory (Nicolet iS10 spectrophotometer, Thermo Scientific, Inc.) was used to determine the chemical functionality of chitin nanofibers and thiol-modified chitin nanofibers. The freeze-dried samples were analyzed in the range from about 4000 $cm^{-1}$ to about 650 $cm^{-}$.

Figure 19:
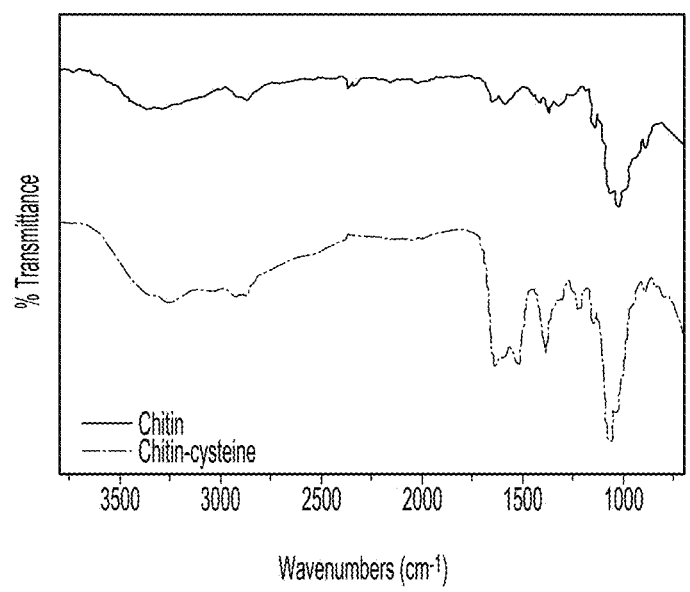
FIG. 19 is an FTIR spectrum of chitin nanofibers and thiol-modified chitin nanofibers of the present disclosure.

FT-IR spectroscopy was applied to verify the presence of functional groups by the modification reaction (FIG. 19). For this analysis, both unmodified and modified chitin nanofibers were freeze-dried after dialysis. FIG. 19 shows the IR spectra of chitin nanofibers and thiol-modified chitin nanofibers. The broad band at 1650 $cm^{-1}$ in thiol-modified chitin could be due to the carbonyl adsorption which overlapped with the amide I band. The primary amine adsorption was seen at 1590 $cm^{-1}$ in chitin, where the amide II band was seen at 1550 $cm^{-1}$ in chitin-cysteine. These observations indicated the success grafting of cysteine molecules onto the chitin nanofibers surface. In addition, IR absorbance around 1400 $cm^{-1}$ was noted, which could be identified as the thiazolidine ring from the formation of alkylthiazolidine through reaction of aldehyde groups and cysteine.

Figure 20:
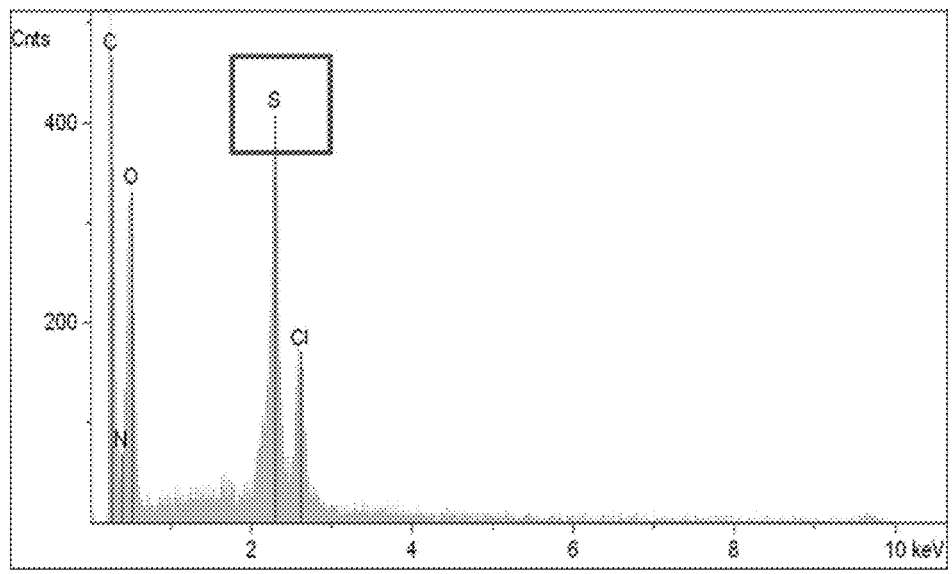
FIG. 20 is an EDS with quantitative analysis of thiol-modified chitin nanofibers of the present disclosure.

The EDS analysis of freeze-dried cysteine-modified chitin nanofibers verified the presence of sulfur (FIG. 20), providing additional evidence that cysteine was successfully grafted onto the chitin nanofibers. The EDS data indicated the weight percentage of each element present (Table 5), which allowed quantitative analysis of functional groups on the chitin nanofiber surface. Based on the molecular structure of thiol-modified chitin, the amount of thiol was estimated to be 2.0±0.2 mmol/g of chitin nanofiber.

TABLE 5

The weight percentage of each element determined from the EDS data

| | Element | | | |
|---|---|---|---|---|
| | C | O | N | S |
| Weight Percentage (%) | 34.3 ± 0.7 | 38.3 ± 1.0 | 17.8 ± 0.5 | 6.3 ± 0.7 |

After the dialysis treatment, the thiol concentration of the modified chitin nanofibers in suspension was determined by Ellman's reagent to identify the amount of thiol grafting on the surface of cellulose nanofibers. In this method, the concentration of the colored compound formed through the application of Ellman's reagent was quantified by measuring the UV adsorption at 412 nm wavelength. The highest concentration of thiol obtained on the chitin nanofiber surface was found to be 1.1 mmol/g of chitin, where the maximum primary amine was 1.7 mmol/g of chitin. This result suggested that about 65% of amine groups on the chitin surface were grafted with cysteine. However, it is also conceivable that some amine groups might react with cysteine oligomers, which would lower the percentage of reacted amine.

Example 14

The As (III) adsorption experiment was performed to evaluate the adsorption capability of chitin nanofibers (in suspension) before and after the thiol modification. In this test, about 100 ppm sodium arsenite ($Na_3AsO_3$) in DI water was used as the stock solution. Arsenic solutions with different concentrations were prepared by diluting the stock solution from about 10 to about 100 ppm. The As (III) adsorption capability of about 0.5 wt % chitin nanofibers before and after the thiol-modification was determined by using arsenic solutions at different concentrations in the pH range between about 4 and about 11 (the pH level was adjusted by NaOH or HCl solutions).

Before the analysis for As, the As-adsorbed chitin nanofibers were separated from the suspension by passing it through a 0.22 μm pore-size Millipore syringe filter at a constant flow rate of 1 ml/min at room temperature. The adsorption capability of the chitin nanofibers in suspension was determined by the following equation, $$Q = \frac{(C_i - C_f)V}{M} \quad (13)$$

where Q refers to the amount of arsenite adsorbed (mg/g), $C_i$ represents the initial arsenite ion concentration while $C_f$ represents the final arsenite ion concentration (mg/L), V is the volume of solution (L) and M is the weight of the adsorbent.

A Perkin Elmer PinAAcle 900T graphite furnace atomic absorption spectrometer (GFAA) was used to determine the arsenic concentration in solution. Samples were prepared using a diluent of about 0.2 wt % of $HNO_3$ and about 1 wt % of $Mg(NO_3)_2$ as a matrix modifier. The atomization temperature was about 2000° C.

Example 15

The pH value of the solution had a notable effect on the static As(III) adsorption performance of thiol-functionalized chitin nanofibers. This was because when the pH value was below the pKa value of chitin (6.5), the amine groups were completely positively ionized in aqueous suspension; when the pH value was above the pKa value of cysteine (8 to 9), negatively charged thiolates formed. In addition, the pH value also affected the behavior of arsenic ions in aqueous solution. For instance, when pH<4, neutral $H_3AsO_3$ is the dominant species; when pH is >4, negatively charged $H_2AsO_3^-$, $HAsO^{2-}$ and $AsO_3^{3-}$ species are predominant.

In this example, grafting of cysteine was carried out to create adsorption sites for arsenic metal ion ($AsO_2^-$) removal. The thiol-functionalized chitin nanofibers ([—SH]=1.1 mmol/g) were characterized by titration, Fourier transform infrared (FT-IR) spectroscopy, energy dispersive spectroscopy (EDS) and scanning electron microscopy (SEM). The arsenic adsorption performance of thiol-modified chitin nanofibers was evaluated under different pH conditions and at different metal ion concentrations, where the maximum adsorption capacity was found to be 149 mg/g at pH=7.0 using the Langmuir Model. This adsorption capacity was higher than any existing chitin/chitosan-based hydrogel or bead absorbent systems.

Figure 21:
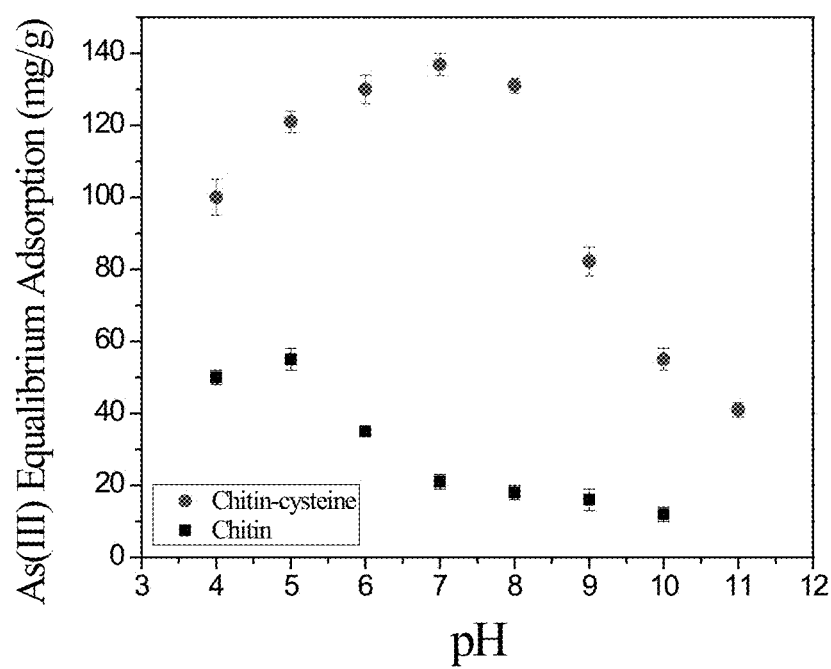
FIG. 21 is a graph showing the As (III) adsorption performance by chitin and thiol-modified chitin nanofibers of the present disclosure, as a function of the pH value.

FIG. 21 illustrates the As(III) (i.e., $AsO_3^{3-}$) adsorption performance by chitin and thiol-chitin nanofibers as a function of the pH value from 4.0 to 11.0, which was chosen because most arsenic pollution in rivers and lakes occurs within the pH range of 5.0 to 8.0. The amount of the As(III) adsorption was determined by AAS and calculated using the arsenite concentration differences before and after the adsorption, multiplied by the volume of solution and then divided by the mass of the adsorbent. It was found that the highest adsorption amount was 138 mg arsenite/g of thiol-modified chitin nanofibers at a pH=7.0. In comparison, the maximum adsorption of unmodified chitin nanofibers was 58 mg/g, which was less than half of that of the thiol-modified chitin nanofibers. This could be explained by the higher concentration of thiol (i.e., 1.1 mmol/g of chitin) resulting the formation of As (III)-thiolate complex on the chitin nanofiber surface. If the thiol-arsenite follows the 1:1 ratio coordination, the theoretical As(III) adsorption would be 118 mg/g. However, as the protonated amine group also had interactions with arsenite, as indicated in unmodified chitin nanofiber (58 mg/g), this would result in a higher total theoretical arsenite adsorption of 176 mg/g by thiol-chitin nanofibers. The appearance of the maximum As(III) adsorption was at around pH=7.0. When the pH value was between 4.0 and 7.0, the dominant arsenic species were negatively charged, and the protonated amine groups could adsorb arsenic ions on to the nanofibers surface due to electrostatic interactions between the oppositely-charged species and the van der Waals attraction for the neutral species. However, when the pH value was increased, the As-thiolate complex formation was inhibited and the charge interaction-induced adsorption began to fail due to the deprotonation of amines.

Example 16

Figure 22A:
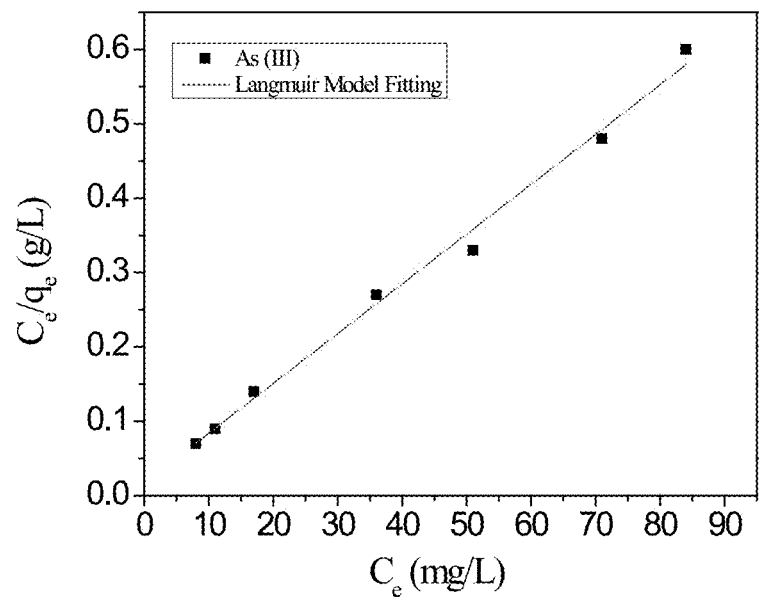
FIGS. 22A-22B are graphs of adsorption isotherms of As (III) adsorption by thiol-chitin nanofibers of the present disclosure as analyzed by a Langmuir model (FIG. 22A) and Freundlich model (FIG. 22B).
Figure 22B:
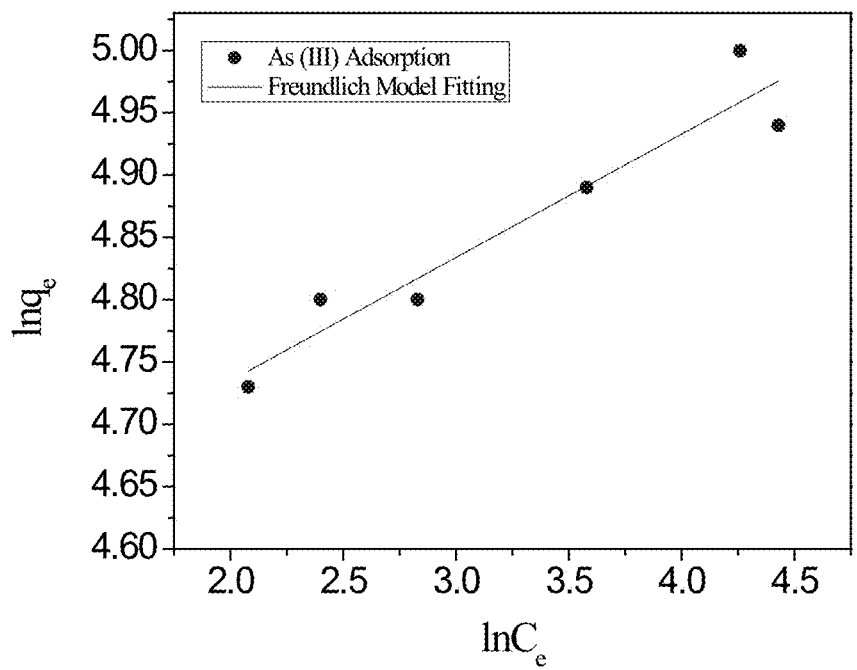

Adsorption isotherms are commonly used to calculate the maximum adsorption capacity by studying the interactions between adsorbents and adsorbates. Both the Langmuir Adsorption Model and the Freundlich Model were applied to calculate the arsenic ion adsorption capacity of thiol-modified chitin nanofibers in aqueous suspension. The Langmuir Model is shown as follows:

$$\frac{C_e}{q_e} = \frac{C_e}{q_m} + \frac{1}{bq_m} \quad (14)$$

where $q_e$ (mg/g) is the amount of metal ions adsorbed on the membrane at the equilibrium condition, $C_e$ (mg/L) is the equilibrium metal ion concentration, $q_m$ (mg/g) is the maximum adsorption of the metal ions and b is the Langmuir constant (L/mg). The Langmuir constant represents the corresponding binding energy of adsorption, whereby a higher b value corresponds to a higher binding affinity between adsorbates and adsorbents. FIGS. 22A-22B illustrated As(III) adsorption isotherms for thiol-modified chitin nanofibers in aqueous suspension at pH=7.0, depicting the relationship between $C_e/q_e$ and $C_e$. It was found that this relationship exhibited a straight line (the slope represented $1/q_m$ and the intercept represented $1/(bq_m)$), which clearly suggested that the As(III) adsorption isotherm data of thiol-modified chitin nanofibers could be well described by the Langmuir Adsorption Model (FIG. 22A).

Adsorption isotherms were also analyzed using the Freundlich Model, which has the following relationship:

$$\ln q_e = \ln K_f + \frac{\ln C_e}{n} \quad (15)$$

where $q_e$ is the amount of metal ions adsorbed on the membrane at equilibrium (mg/g), $K_f$ is the maximum adsorption of the metal ions (mg/g), $C_e$ is the equilibrium metal ion concentration in solution (mg/L), n is the adsorption constant of the membrane. The linear plot of $\ln q_e$ versus $\ln C_e$ can generate the corresponding $K_f$ and n value, where the results are also shown in FIG. 22B. It was found that the adsorption isotherm data could also be fitted by the Freundlich Model, although the fit seemed to be poorer than that of the Langmuir Adsorption Model.

Based on the results from FIGS. 22A-22B, the maximum adsorption capacity, the Langmuir and Freundlich constants and correlation coefficients, were extracted from adsorption isotherms of As (III) ions for thiol-chitin nanofibers. These parameters are listed in Table 6. It was found that the As (III) adsorption isotherm data was better described by the Langmuir Model, as it exhibited a better correlation coefficient ($R^2$=0.997) and a larger adsorption capacity (149 mg/g at its optimum adsorption pH values) than those from the Freundlich Model.

TABLE 6

Parameters extracted from adsorption isotherms of As (III) using both Langmuir and Freundlich models

| As (III) | Maximum Adsorption | Model Constant | Correlation Coefficient |
|---|---|---|---|
| Langmuir Model | $q_m$ (mg/g) 149 | b (L/mg) 0.392 | $R^2$ 0.997 |
| Freundlich Model | $K_f$ (mg/g) 92.8 | n 10.4 | $R^2$ 0.900 |

Example 17

The best As(III) adsorption data from thiol-modified chitin nanofibers in aqueous suspension was compared with those of other adsorbents at their optimal adsorption conditions, where the comparison results are listed in Table 7. It was found that ferrihydrite exhibited the highest adsorption capability of 266.5 mg/g at pH=9, followed by thiol-modified chitin nanofibers of 149 mg/g at pH=7 and active carbon (from coconut husk) of 146.3 mg/g at pH=12. The very high adsorption capability in ferrihydrite could be attributed to the strong binding affinity between ferrihydrite and arsenic ions under the optimal conditions, as well as the freeze-dried sample preparation scheme which produced a very large surface to volume ratio. It is clear from the prospect of practicality (e.g. pH=7), thiol-modified chitin nanofibers appear to stand out as a superb candidate. This is because the thiol groups exhibit a strong affinity to arsenic ions at pH=7, and the dispersed nanofiber format offers a very high surface areas for As(III) adsorption.

TABLE 7

Comparison of different adsorbents for arsenic adsorption under the optimum adsorption conditions

| Adsorbents | As (III) adsorption (mg/g) | Optimum adsorption pH | Initial As (III) Concentration |
|---|---|---|---|
| Thiol-resin dry powder | 30 | 8 | 10 ppm |
| Thiol-chitosan bead | 2.5 | 7.0 | 10 ppm |
| Chitosan powder | 58 | 4.0 | 400 ppm |
| Activated carbon (coconut husk) | 146.3 | 12.0 | 50-600 ppm |
| Bead cellulose loaded with iron oxyhydroxide (BCF) | 99.6 | 7.0 | 1-100 mmol/L |
| Ferrihydrite | 266.5 | 9 | 0.267-26.7 mmol/L |
| Chitin nanofiber | 56 | 6.0 | 50 ppm |
| Thiol-modified chitin nanofiber | 149 | 7.0 | 50 ppm |

In summary, ultra-fine chitin nanofibers (diameter in tens of nanometers; in some cases in the shape of ribbon with thickness about 6 nm and width about 24 nm) possessing a substantial amount of amine groups (1.7 mmol/g) on the surface were generated by a series of chemical and mechanical treatments. These chitin nanofibers could be subsequently grafted with cysteine to create thiol-modified chitin nanofibers (thiol concentration 1.1 mmol/g). The small size of the nanofibers provided a very large surface-to-volume ratio, thus offering abundant active sites for adsorption of arsenic (As(III)) ions. The thiol-modified chitin nanofibers exhibited a maximum capacity of 149 mg/g (at pH=7.0) as determined by the Langmuir Adsorption Model. The As (III) adsorption performance of this system was found to be excellent, which can be attributed to the large surface area and abundant functionality of the modified nanofibers. This adsorption capacity was higher than any existing chitin/chitosan-based hydrogel or bead absorbent systems, and was comparable to the best absorbent systems demonstrated thus far for practical arsenic removal conditions (e.g. pH=7.0).

While the above description contains many specific details of methods in accordance with this disclosure, these specific details should not be construed as limitations on the scope of the disclosure, but merely as exemplifications of preferred embodiments thereof. Those skilled in the art will envision many other possible variations that are all within the scope and spirit of the disclosure.

What is claimed is:

1. A method comprising:
    contacting ultra-fine polysaccharide nanofibers with an oxidation agent, an acid, and a base, to form an activated polysaccharide nanofiber possessing functional groups selected from the group consisting of carboxylates, aldehydes, amines, and combinations thereof;
    contacting the activated polysaccharide nanofiber with at least one reactant selected from the group consisting of cystamine, 3-amino-1-propanethiol, 6-amino-1-hexanethiol, 8-amino-1-octanethiol, 11-amino-1-undecanethiol, 16-amino-1-hexadecanethiol, 3-mercaptopropionic acid, 6-mercaptohexanoic acid, 8-mercaptooctanoic acid, 11-mercaptoundecanoic acid, 12-mercaptododecanoic acid, 16-mercaptohexadecanoic acid, and combinations thereof to form thiol-functional polysaccharide nanofibers; and
    recovering the thiol-functional polysaccharide nanofibers possessing thiol groups.

2. The method of claim 1, further comprising contacting the ultra-fine polysaccharide nanofibers, the at least one reactant, or both, with a catalyst.

3. The method of claim 2, wherein the catalyst is selected from the group consisting of 1-ethyl-3-(3-dimethylaminopropyl)carbodiimide hydrochloride, N-hydroxysuccinimide, and combinations thereof.

4. The method of claim 1, wherein the ultra-fine polysaccharide nanofibers include a polysaccharide selected from the group consisting of cellulose, chitin, collagen, gelatin, chitosan, microcrystalline cellulose, bacterial cellulose, starch, alginic acid, and combinations thereof.

5. The method of claim 1, wherein the oxidation agent is selected from the group consisting of sodium hypochlorite, sodium chlorite, concentrated nitric acid/sodium nitrite, and combinations thereof.

6. The method of claim 1, wherein the acid is selected from the group consisting of hydrochloric acid, nitric acid, sulfuric acid, perchloric acid, trifluoroacetic acid, formic acid, and combinations thereof.

7. The method of claim 1, wherein the base is selected from the group consisting of sodium hydroxide, lithium hydroxide, potassium hydroxide, and combinations thereof.

8. The method of claim 1, further comprising forming a membrane with the thiol-functional polysaccharide nanofibers.

9. The method of claim 8, further comprising contacting a nanofibrous scaffold layer with a solution possessing the thiol-functional polysaccharide nanofibers.

10. The method of claim 9, wherein the scaffold layer comprises nanofibers having diameters from about 50 nm to about 500 nm.

11. The method of claim 9, wherein the scaffold layer possesses pores with average pore sizes from about 10 nm to about 200 μm.

12. The method of claim 9, wherein the scaffold layer has a thickness of from about 10 μm to about 300 μm.

13. The method of claim 9, further comprising applying the nanofibrous scaffold to a substrate layer comprising non-woven fibers of a material selected from the group consisting of poly(ethylene terephthalate), polypropylene, glass and cellulose.

* * * * *